US009109750B2

(12) United States Patent
Okawachi et al.

(10) Patent No.: US 9,109,750 B2
(45) Date of Patent: *Aug. 18, 2015

(54) GAS FILLING METHOD, GAS FILLING SYSTEM, GAS STATION AND MOBILE UNIT

(75) Inventors: Eiji Okawachi, Toyota (JP); Tsukuo Ishitoya, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 358 days.

This patent is subject to a terminal disclaimer.

(21) Appl. No.: 13/642,564

(22) PCT Filed: Apr. 20, 2011

(86) PCT No.: PCT/IB2011/000863
§ 371 (c)(1),
(2), (4) Date: Oct. 22, 2012

(87) PCT Pub. No.: WO2011/132063
PCT Pub. Date: Oct. 27, 2011

(65) Prior Publication Data
US 2013/0037165 A1    Feb. 14, 2013

(30) Foreign Application Priority Data
Apr. 23, 2010  (JP) ................................ 2010-100076

(51) Int. Cl.
*F17C 5/06*  (2006.01)
*F17C 7/00*  (2006.01)
*F17C 13/02*  (2006.01)

(52) U.S. Cl.
CPC ... *F17C 5/06* (2013.01); *F17C 7/00* (2013.01); *F17C 13/025* (2013.01);
(Continued)

(58) Field of Classification Search
USPC ................ 141/1, 2, 4, 94–95; 73/37, 37.5
See application file for complete search history.

(56) References Cited

U.S. PATENT DOCUMENTS

| 5,115,219 A | 5/1992 | Withers et al. |
| 6,598,624 B2 * | 7/2003 | Togasawa et al. ............... 141/1 |

(Continued)

FOREIGN PATENT DOCUMENTS

| EP | 1 818 597 A | 8/2007 |
| EP | 1 865 248 A1 | 12/2007 |

(Continued)

OTHER PUBLICATIONS

Invitation to Pay Additional Fees in International Application No. PCT/IB2011/000863; Mailing Date: Sep. 1, 2011.

(Continued)

*Primary Examiner* — Nicolas A Arnett
(74) *Attorney, Agent, or Firm* — Finnegan, Henderson, Farabow, Garrett & Dunner, LLP

(57) ABSTRACT

A gap amount (62) between a liner (53) and a reinforcement layer (55) before filling gas into a tank (30) is calculated on the basis of a tank pressure and a tank temperature in the tank (30). It is predicted whether a load larger than or equal to an allowable amount acts on the liner (53) by the gas filling on the basis of the calculated gap amount (62). When it is predicted that the load larger than or equal to the allowable amount acts on the liner (53), a filling flow rate at which the gas is filled into the tank (30) is limited in comparison with a case where it is predicted that the load larger than or equal to the allowable amount does not act on the liner (53).

25 Claims, 18 Drawing Sheets

(52) U.S. Cl.
CPC ...... *F17C 13/026* (2013.01); *F17C 2203/0604* (2013.01); *F17C 2203/066* (2013.01); *F17C 2203/067* (2013.01); *F17C 2203/0619* (2013.01); *F17C 2205/0326* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0157* (2013.01); *F17C 2227/0341* (2013.01); *F17C 2227/0388* (2013.01); *F17C 2250/032* (2013.01); *F17C 2250/034* (2013.01); *F17C 2250/043* (2013.01); *F17C 2250/0439* (2013.01); *F17C 2250/0491* (2013.01); *F17C 2250/0495* (2013.01); *F17C 2250/0636* (2013.01); *F17C 2250/072* (2013.01); *F17C 2260/02* (2013.01); *F17C 2265/065* (2013.01); *F17C 2270/0105* (2013.01); *F17C 2270/0139* (2013.01); *F17C 2270/0189* (2013.01); *F17C 2270/0545* (2013.01); *Y02E 60/321* (2013.01); *Y02E 60/324* (2013.01); *Y02T 10/84* (2013.01)

(56) References Cited

U.S. PATENT DOCUMENTS

| | | | |
|---|---|---|---|
| 8,435,700 B2* | 5/2013 | Okawachi et al. | 429/515 |
| 8,656,938 B2* | 2/2014 | Hobmeyr et al. | 137/12 |
| 8,708,005 B2* | 4/2014 | Mori | 141/197 |
| 8,783,303 B2* | 7/2014 | Harty et al. | 141/11 |
| 2002/0014277 A1* | 2/2002 | Togasawa et al. | 141/95 |
| 2002/0088806 A1 | 7/2002 | Takaku et al. | |
| 2009/0078706 A1* | 3/2009 | Ishitoya et al. | 220/562 |
| 2009/0203845 A1* | 8/2009 | Fukui et al. | 525/190 |
| 2011/0259469 A1* | 10/2011 | Harty et al. | 141/4 |
| 2013/0052557 A1* | 2/2013 | Okawachi et al. | 429/444 |
| 2013/0087244 A1* | 4/2013 | Maier | 141/94 |
| 2013/0269828 A1* | 10/2013 | Mathison | 141/4 |

FOREIGN PATENT DOCUMENTS

| | | |
|---|---|---|
| JP | 8-68497 | 3/1996 |
| JP | 9-178094 | 7/1997 |
| JP | 10-231998 | 9/1998 |
| JP | 2002-89793 | 3/2002 |
| JP | 2002-188794 | 7/2002 |
| JP | 2004-127817 | 4/2004 |
| JP | 2005-315367 | 11/2005 |
| JP | 2006-226511 | 8/2006 |
| JP | 2009-127853 | 6/2009 |
| WO | WO 2011/092560 A1 | 8/2011 |
| WO | WO 2011/092562 A2 | 8/2011 |

OTHER PUBLICATIONS

Written Opinion of the International Searching Authority in International Application No. PCT/IB2011/000863; Mailing Date: Nov. 18, 2011.
Applicant's Response in International Application No. PCT/IB2011/000863 (Jan. 30, 2012).
Glaessgen, E. et al., "Debonding Failure of Sandwich-Composite Cryogenic Fuel Tank with Internal Core Pressure," Journal of Spacecraft and Rockets, vol. 42, No. 4, Jul.-Aug. 2005, pp. 613-627.
International Search Report and Written Opinion issued in PCT/JP2010/058005 dated Aug. 17, 2010.

* cited by examiner

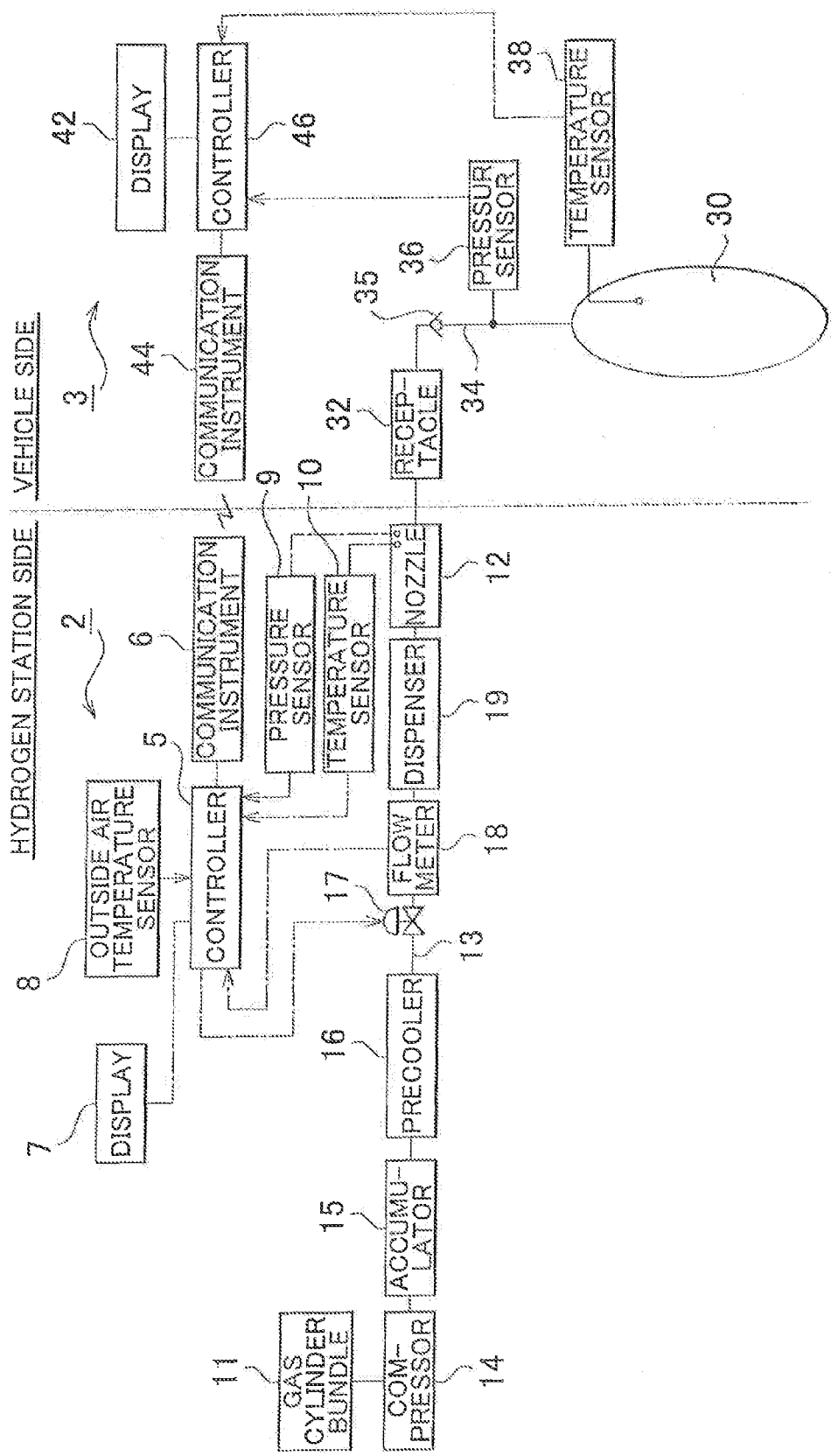

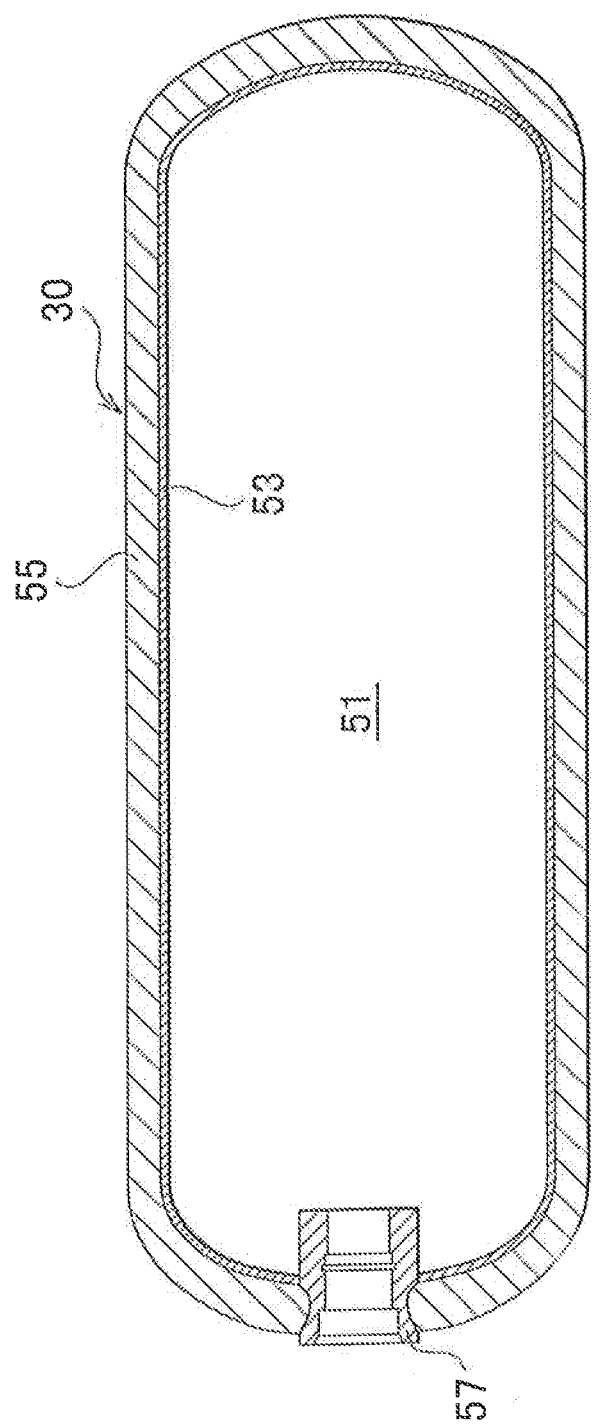

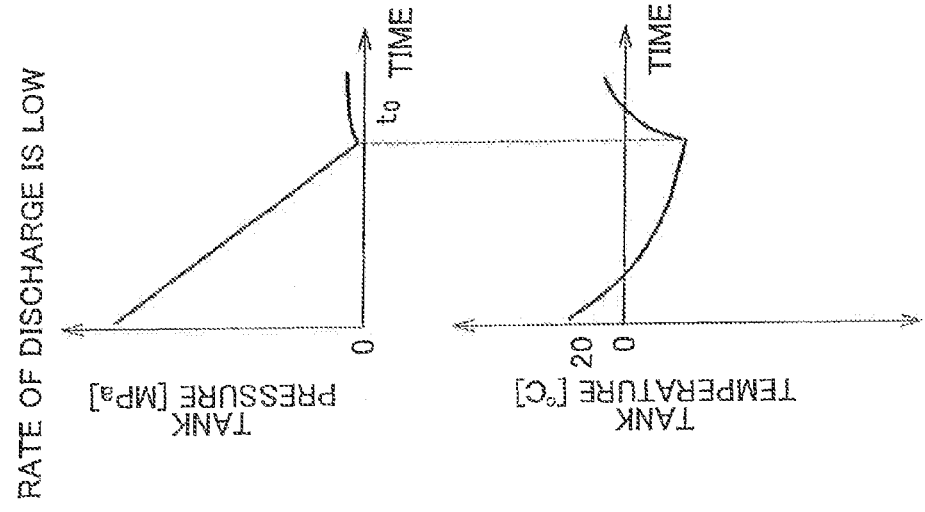
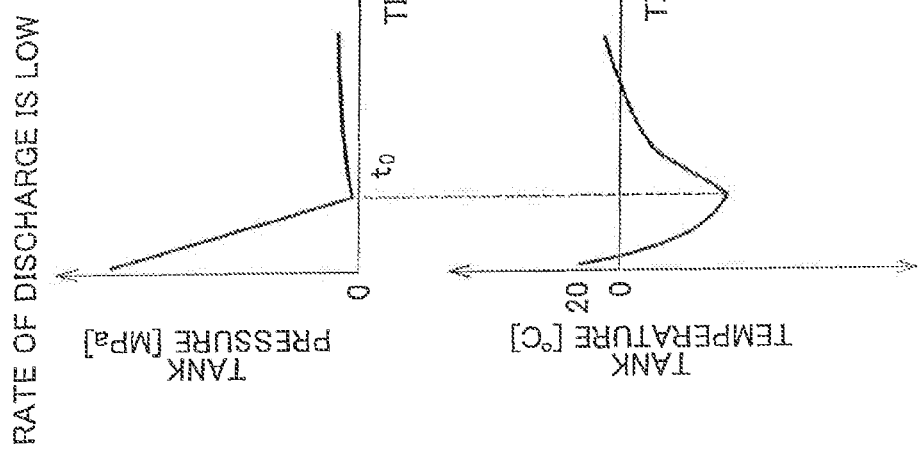

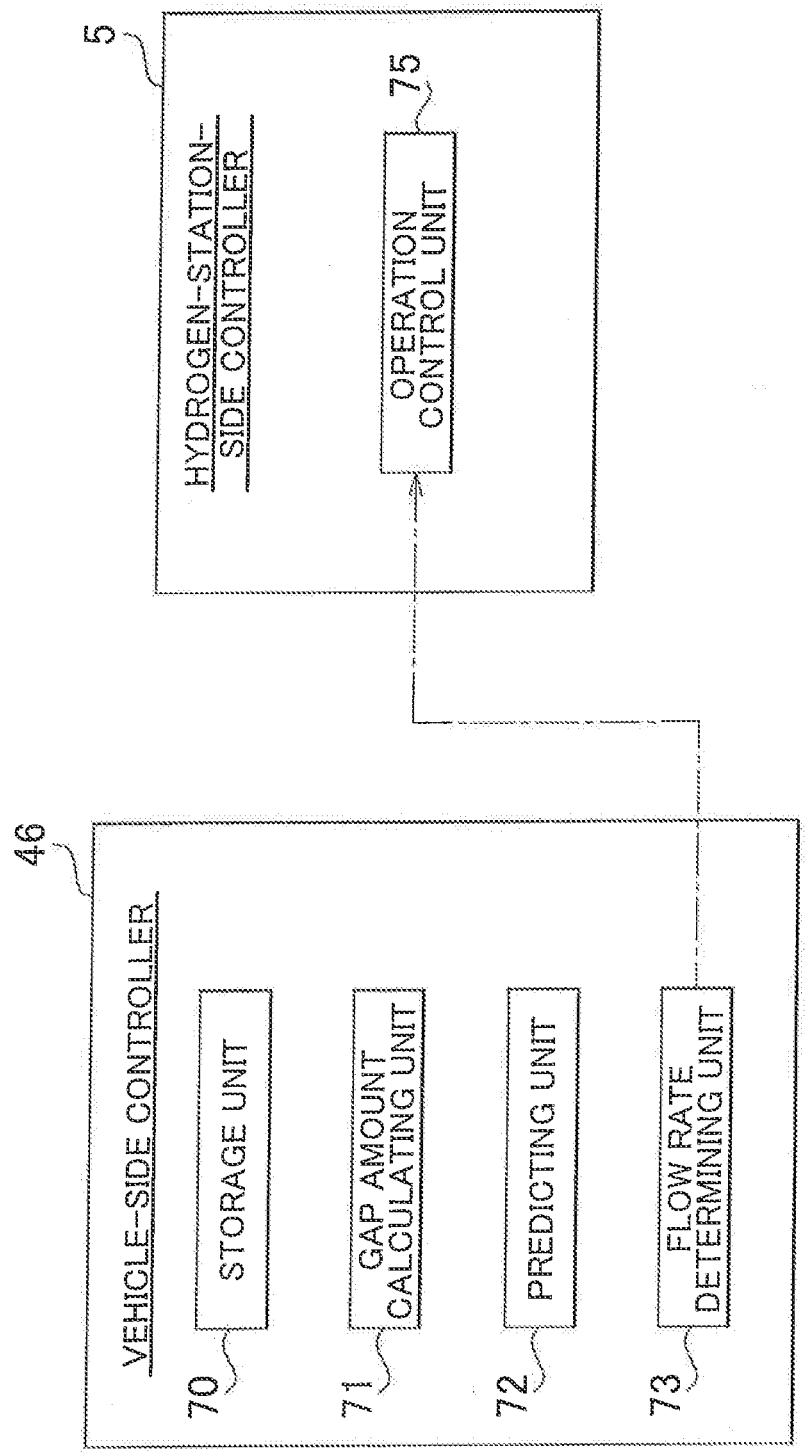

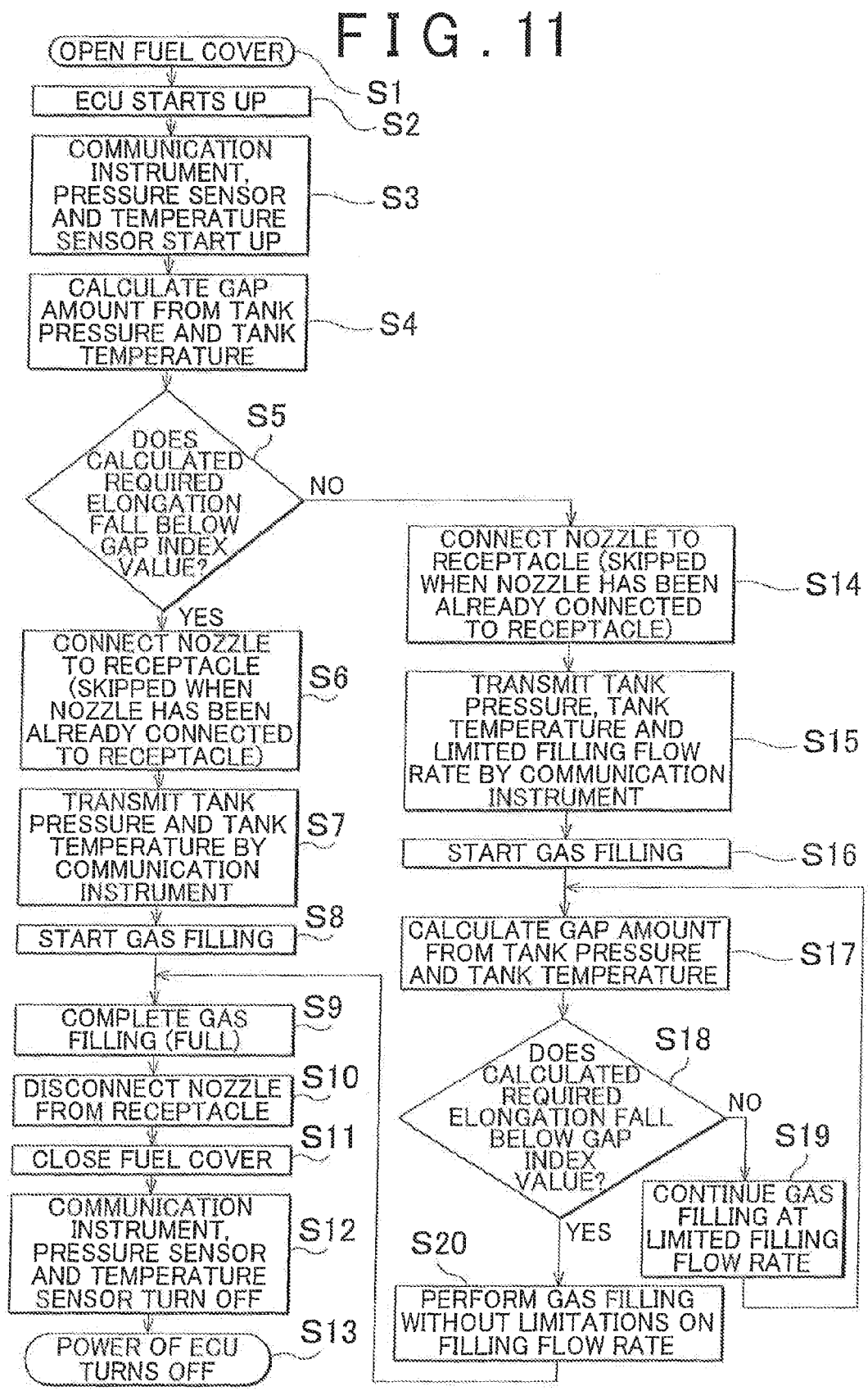

GAS FILLING METHOD, GAS FILLING SYSTEM, GAS STATION AND MOBILE UNIT

CROSS-REFERENCE TO RELATED APPLICATIONS

This application is a national phase application of International Application No. PCT/IB2011/000863, filed Apr. 20, 2011, and claims the priority of Japanese Application No. 2010-100076, filed Apr. 23, 2010, the content of both of which is incorporated herein by reference.

BACKGROUND OF THE INVENTION

1. Field of the Invention

The invention relates to a gas filling method, gas filling system, gas station and mobile unit that fill gas from the gas station into a vehicle-mounted tank.

2. Description of the Related Art

It is known that when hydrogen gas is filled into a tank, the temperature in the tank increases. In terms of this point, for example, Japanese Patent Application Publication No. 2002-89793 (JP-A-2002-89793) points out a problem that the filling rate needs to be determined while the temperature is being managed and then suggests a structure that suppresses an increase in temperature of a valve and filling pipe that are located upstream of the tank.

As shown by JP-A-2002-89793, the structure of the tank of this type is such that the outer peripheral surface of a gas-impermeable liner is covered with a reinforcement layer that ensures pressure resistance. For example, the reinforcement layer is formed so that CFRP formed by filament winding, or the like, is wound around the outer peripheral surface of the liner.

SUMMARY OF INVENTION

However, particularly, when a tank made of a resin liner is manufactured, the liner contracts because of a difference in modulus of elasticity and coefficient of linear expansion between the liner and the CFRP, causing a gap to be formed between the liner and the CFRP. In addition, if no gap occurs in the manufacturing stage, the liner contracts because of the difference in modulus of elasticity, and the like, under a low-pressure or low-temperature condition, causing a gap to be formed between the liner and the CFRP. Then, as the pressure decreases or as the temperature decreases, the size of the gap tends to increase.

If hydrogen gas is filled into the tank in a state where such a gap is formed, the filled hydrogen gas causes the contracted liner to expand to fill the gap. However, if the amount of deformation of the liner resulting from the expansion is large or the speed of deformation of the liner resulting from the expansion is high, there is a possibility that a large load acts on the liner.

The invention provides a gas filling method, gas filling system, gas station and mobile unit that are able to reduce a load on a liner of a tank.

A first aspect of the invention relates to a gas filling method that fills gas into a tank having a liner and a reinforcement layer formed on an outer peripheral surface of the liner. The gas filling method includes: calculating an amount of gap between the liner and the reinforcement layer before filling the gas into the tank on the basis of a tank pressure and a tank temperature in the tank; predicting whether a load larger than or equal to an allowable amount acts on the liner by the gas filling on the basis of the calculated amount of gap; and, when it is predicted that the load larger than or equal to the allowable amount acts on the liner, limiting a filling flow rate at which the gas is filled into the tank in comparison with a case where it is predicted that the load larger than or equal to the allowable amount does not act on the liner.

With the above configuration, not a uniform filling flow rate is set irrespective of an amount of gap but a filling flow rate is limited when it is predicted that a load larger than or equal to an allowable amount acts on the liner by gas filling. Thus, when the gas is filled into the tank at the limited filling flow rate, it is possible to suppress a deformation speed at which the liner deforms to fill the gap. By so doing, it is possible to reduce a load on the liner.

In the gas filling method according to the above aspect, limiting the filling flow rate may include filling the gas into the tank at a limited filling flow rate during at least part of a first period of time during which the liner deforms by the gas filling to bring the amount of gap into zero. With the above configuration, during at least part of the period of time taken to fill the gap, the liner deforms at the limited filling flow rate, so it is possible to reduce a load on the liner.

The gas filling method according to the above aspect may further include filling the gas into the tank without limitations on the filling flow rate after a lapse of at least the first period of time. With the above configuration, at least after the gap is filled, gas may be filled into the tank at a filling flow rate higher than a filling flow rate till then, so it is possible to reduce a period of time for gas filling.

In the gas filling method according to the above aspect, predicting whether the load larger than or equal to the allowable amount acts on the liner by the gas filling may include calculating an elongation of the liner, required to bring the calculated gap amount into zero, and, when the calculated elongation of the liner exceeds a predetermined threshold, predicting that the load larger than or equal to the allowable amount acts on the liner. With the above configuration, it is predicted on the basis of an elongation (strain) of the liner relevant to deformation of the liner, so the reliability of the prediction increases.

In the gas filling method according to the above aspect, the predetermined threshold may be a breaking elongation of the liner, and may vary depending on a tank temperature in the tank. With the above configuration, the fact that the breaking elongation depends on the temperature is considered at the time of prediction, so the reliability of the prediction further increases.

In the gas filling method according to the above aspect, limiting the filling flow rate may include varying a limited amount of the filling flow rate depending on the calculated required elongation of the liner. With the above configuration, it is possible to achieve both reduction in load on the liner and reduction in period of time for gas filling. For example, when the calculated required elongation is small, the filling flow rate may be increased in comparison with a case where the calculated required elongation is large, so it is possible to reduce a period of time for gas filling while reducing a load on the liner.

In the gas filling method according to the above aspect, limiting the filling flow rate may include limiting the filling flow rate in such a manner that a map that defines a relationship between a liner deformation speed at the time of filling a gap between the liner and the reinforcement layer and a breaking elongation of the liner is consulted for the calculated required elongation of the liner to set a liner deformation speed that is lower than a liner deformation speed at which the load larger than or equal to the allowable amount acts on the liner. With the above configuration, by utilizing such a map, it is possible to limit the filling flow rate at a liner deformation speed at which the load larger than or equal to the allowable amount does not act on the liner.

In the gas filling method according to the above aspect, a plurality of the maps may be respectively provided for tank temperatures in the tank, and limiting the filling flow rate may include varying a limited amount of the filling flow rate depending on a tank temperature in the tank in such a manner that one of the plurality of maps, which corresponds to the tank temperature used to calculate the amount of gap, is consulted. With the above configuration, the fact that the breaking elongation depends on the temperature is considered even at the time of determining a filling flow rate, so it is possible to reduce a period of time for gas filling while reducing a load on the liner. For example, when the tank temperature in the tank is high, the liner deformation speed (filling flow rate) may be increased in comparison with a case where the tank temperature in the tank is low.

In the gas filling method according to the above aspect, the tank may be equipped for a mobile unit, and may be configured so that gas may be filled from a gas station installed outside the mobile unit, the mobile unit may determine a limited filling flow rate in limiting the filling flow rate, and may transmit information about the determined limited filling flow rate to the gas station, and the gas station may fill the gas into the tank on the basis of the information about the limited filling flow rate, received from the mobile unit. With the above configuration, it is possible to execute control from the mobile unit side so as to limit the filling flow rate.

In the gas filling method according to the above aspect, the tank may be equipped for a mobile unit, and may be configured so that gas may be filled from a gas station installed outside the mobile unit, calculating the amount of gap, predicting whether the load larger than or equal to the allowable amount acts on the liner by the gas filling and limiting the filling flow rate may be executed by the gas station. With the above configuration, it is possible to execute control at the gas station side so as to limit the filling flow rate.

In the gas filling method according to the above aspect, in calculating the amount of gap, the gas station may receive information about a tank pressure and a tank temperature in the tank from the mobile unit via communication. With the above configuration, the gas station is able to easily acquire information in the tank located outside the gas station.

The gas filling method according to the above aspect may further include, when the filling flow rate is limited to zero, prohibiting the gas filling or may include providing a notification that the gas filling is prohibited.

In the gas filling method according to the above aspect, limiting the filling flow rate may include limiting the filling flow rate so that a liner deformation speed at which a gap between the liner and the reinforcement layer is filled is lower than a liner deformation speed at which the load larger than or equal to the allowable amount acts on the liner, or may include limiting the filling flow rate in such a manner that a map that defines a relationship between a liner deformation speed and a breaking elongation of the liner is consulted for an elongation of the liner, required to bring the calculated amount of gap into zero, to thereby set a liner deformation speed that is lower than a liner deformation speed at which the load larger than or equal to the allowable amount acts on the liner.

In addition, in the gas filling method according to the above aspect, limiting the filling flow rate may include varying a limited amount of the filling flow rate depending on at least one of the calculated amount of gap, an elongation of the liner, required to bring the amount of gap into zero, and a tank temperature in the tank.

A second aspect of the invention relates to a gas filling system that includes a mobile unit that is equipped with a tank having a liner and a reinforcement layer formed on an outer peripheral surface of the liner and a gas station that is installed outside the mobile unit and that fills gas into the tank. In the gas filling system, at least one of the mobile unit and the gas station includes an information acquisition unit that acquires information about a tank pressure and a tank temperature in the tank, a calculating unit that calculates an amount of gap between the liner and the reinforcement layer before filling the gas into the tank on the basis of the information acquired by the information acquisition unit, a predicting unit that predicts whether a load larger than or equal to an allowable amount acts on the liner by filling the gas into the tank on the basis of the calculated amount of gap, and a flow rate determining unit that, when it is predicted that the load larger than or equal to the allowable amount acts on the liner, determines to limit the filling flow rate at which the gas is filled into the tank in comparison with a case where it is predicted that the load larger than or equal to the allowable amount does not act on the liner.

In the gas filling system according to the above aspect, the gas station may include an operation control unit that controls filling of the gas into the tank, and, when it is predicted that the load larger than or equal to the allowable amount acts on the liner, the operation control unit may fill the gas into the tank at a limited filling flow rate, to which the flow rate determining unit determines to limit the filling flow rate, during at least part of a first period of time during which the liner deforms by the gas filling to bring the amount of gap into zero.

A third aspect of the invention relates to a gas station that is installed outside a mobile unit equipped with a tank having a liner and a reinforcement layer formed on an outer peripheral surface of the liner, and that fills gas into the tank. The gas station includes: an information acquisition unit that acquires information about a tank pressure and a tank temperature in the tank; a calculating unit that calculates an amount of gap between the liner and the reinforcement layer before filling the gas into the tank on the basis of the information acquired by the information acquisition unit; a predicting unit that predicts whether a load larger than or equal to an allowable amount acts on the liner by filling the gas into the tank on the basis of the calculated amount of gap; and a flow rate determining unit that, when it is predicted that the load larger than or equal to the allowable amount acts on the liner, determines to limit the filling flow rate at which the gas is filled into the tank in comparison with a case where it is predicted that the load larger than or equal to the allowable amount does not act on the liner.

The gas station according to the above aspect may further include an operation control unit that controls filling of the gas into the tank, wherein, when it is predicted that the load larger than or equal to the allowable amount acts on the liner, the operation control unit may fill the gas into the tank at a limited filling flow rate, to which the flow rate determining unit determines to limit the filling flow rate, during at least part of a first period of time during Which the liner deforms by the gas filling to bring the amount of gap into zero, or the operation control unit may fill the gas into the tank without limitations on the filling flow rate after a lapse of at least the first period of time.

In addition, in the gas station according to the above aspect, the information acquisition unit may acquire results detected by a temperature sensor and a pressure sensor provided for the mobile unit as the information about a tank pressure and a tank temperature in the tank via communication.

In the gas station according to the above aspect, the predicting unit may calculate an elongation of the liner, required to bring the calculated amount of gap into zero, and, when the calculated elongation exceeds a predetermined threshold, the predicting unit may predict that the load larger than or equal to the allowable amount acts on the liner.

In the gas station according to the above aspect, the flow rate determining unit may vary a limited amount of the filling flow rate depending on at least one of the calculated amount of gap, an elongation of the liner, required to bring the amount of gap into zero, and a tank temperature in the tank.

A fourth aspect of the invention relates to a mobile unit that is equipped with a tank into which gas is filled from an external gas station, the tank having a liner and a reinforcement layer formed on an outer peripheral surface of the liner. The mobile unit includes: an information acquisition unit that acquires information about a tank pressure and a tank temperature in the tank; a calculating unit that calculates an amount of gap between the liner and the reinforcement layer before filling the gas into the tank on the basis of the information acquired by the information acquisition unit; a predicting unit that predicts whether a load larger than or equal to an allowable amount acts on the liner by filling the gas into the tank on the basis of the calculated amount of gap; a flow rate determining unit that, when it is predicted that the load larger than or equal to the allowable amount acts on the liner, determines to limit the filling flow rate at which the gas is filled into the tank in comparison with a case where it is predicted that the load larger than or equal to the allowable amount does not act on the liner; and a transmitter that transmits information about the limited filling flow rate, to which the flow rate determining unit determines to limit the filling flow rate, to the gas station.

In the mobile unit according to the above aspect, the predicting unit may calculate an elongation of the liner, required to bring the calculated amount of gap into zero, and, when the calculated elongation exceeds a predetermined threshold, the predicting unit may predict that the load larger than or equal to the allowable amount acts on the liner.

In the mobile unit according to the above aspect, the flow rate determining unit may vary a limited amount of the filling flow rate depending on at least one of the calculated amount of gap, an elongation of the liner, required to bring the amount of gap into zero, and a tank temperature in the tank.

BRIEF DESCRIPTION OF DRAWINGS

The features, advantages, and technical and industrial significance of this invention will be described below with reference to the accompanying drawings, in which like numerals denote like elements, and wherein:

FIG. 2 is a configuration diagram of the gas filling system according to the embodiment;

FIG. 3 is a sectional view of a tank according to the embodiment;

FIG. 4A and FIG. 4B are graphs that show a variation in tank pressure and a variation in tank temperature over time when the outside air temperature is 20° C., in which FIG. 4A shows the case where the rate of discharge of hydrogen gas from the tank is low, and FIG. 4B shows the case where the rate of discharge of hydrogen gas from the tank is high;

FIG. 9A and FIG. 9B are views that show a method of calculating an elongation of the liner, required to fill a gap, in which FIG. 9A shows a state where a gap is formed, and FIG. 9B shows a state where no gap is formed;

FIG. 10 is a functional block diagram for implementing control for limiting the filling flow rate from a vehicle side in a gas filling method according to the embodiment;

FIG. 11 is a flowchart that shows an example of the control shown in FIG. 10;

FIG. 15A and FIG. 15B are maps that define the relationship between the liner deformation speed and the breaking elongation, in which FIG. 15A shows the map for one tank temperature, and FIG. 15B shows the map for two different tank temperatures;

DETAILED DESCRIPTION OF EMBODIMENTS

Hereinafter, an embodiment of the invention will be described with reference to the accompanying drawings.

1. Outline of Gas Filling System

Here, an example in which hydrogen gas is filled from a hydrogen station into a tank of a fuel cell vehicle equipped with a fuel cell system will be described as a gas filling system. The fuel cell system includes a fuel cell, or the like, that generates electricity by electrochemical reaction between fuel gas (for example, hydrogen gas) and oxidant gas (for example, air) as is known publicly. In addition, filling hydrogen gas is one of modes for supplying hydrogen as from the hydrogen station to the tank.

Figure 1:
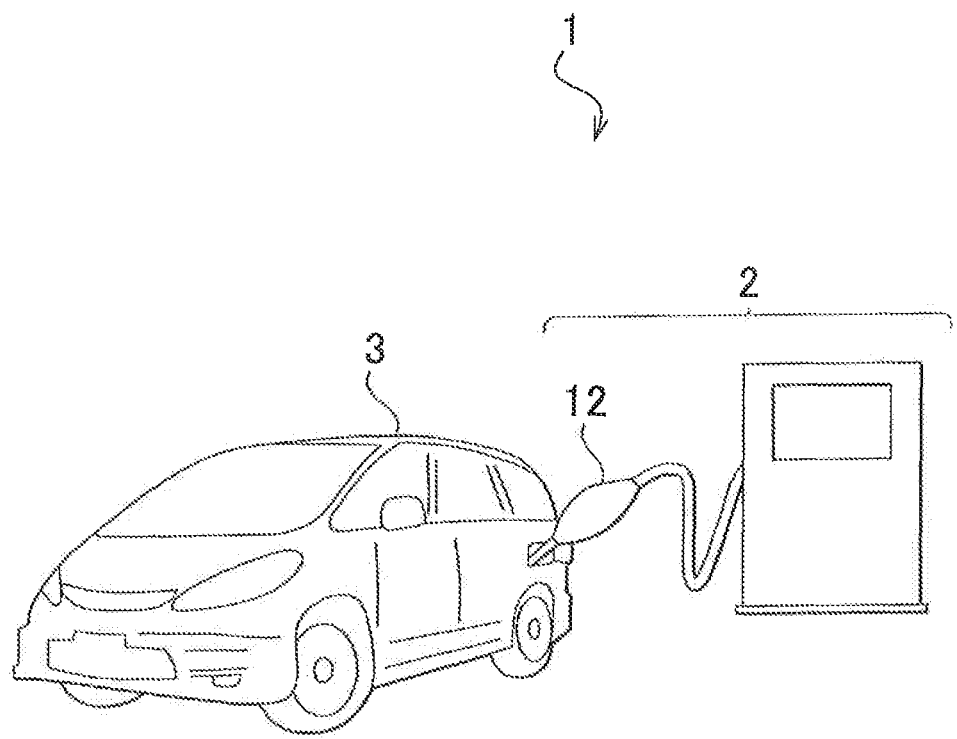
FIG. 1 is a schematic view of a gas filling system according to an embodiment.

As shown in FIG. 1, the gas filling system 1, for example, includes a hydrogen station 2 that serves as a gas station, and a vehicle 3 that is supplied With hydrogen gas from the hydrogen station 2.

1-1. Outline of Vehicle

As shown in FIG. 2, the vehicle 3 includes a tank 30, a receptacle 32, a pressure sensor 36, a temperature sensor 38, a display 42, a communication instrument 44 and a controller 46. The tank 30 is a fuel gas supply source for supplying fuel gas to a fuel cell, and is, for example, a high-pressure tank that is able to store hydrogen gas of 35 MPa or 70 MPa. When a plurality of the tanks 30 are mounted, the tanks 30 are connected to the fuel cell 50 in parallel with one another. Hydrogen gas in the tank 30 is supplied to the fuel cell via a supply conduit (not shown). On the other hand, hydrogen gas is discharged into a filling flow channel 34 via the receptacle 32 to supply hydrogen gas from the hydrogen station 2 to the tank 30. The filling flow channel 34 is formed of a gas conduit outside the tank 30 and a flow passage portion in a valve assembly (not shown) attached to an opening of the tank 30. In addition, a check valve 35 for preventing backflow of hydrogen gas is provided for the filling flow channel 34.

The pressure sensor 36 is provided in the filling flow channel 34. The pressure sensor 36 is used to detect the pressure of hydrogen gas discharged from the hydrogen station 2. For example, the pressure sensor 36 is provided in the gas conduit at a portion downstream of the check valve 35 and immediately before the tank 30, and substantially detects the pressure that reflects the pressure of hydrogen gas in the tank 30 (hereinafter, referred to as "tank pressure"). The temperature sensor 38 is provided in the flow passage portion in the valve assembly, and is arranged inside the tank 30. The temperature sensor 38 detects the temperature that reflects the temperature in the tank 30 (hereinafter, referred to as "tank temperature"). Note that, in another embodiment, the pressure sensor 36 may be arranged inside the tank 30. In addition, the location at which the temperature sensor 38 is arranged inside the tank 30 is not specifically limited as long as the temperature sensor 38 is able to substantially detect the tank temperature.

The display 42 may be, for example, used as part of a car navigation system, and displays various pieces of information on its screen. The communication instrument 44 is used to carry out communication between the vehicle 3 and the hydrogen station 2, and functions as a receiver and a transmitter for receiving and transmitting signals having various pieces of information. The communication instrument 44, for example, has a communication interface that carries out wireless communication, such as infrared-ray communication. The communication instrument 44 is installed in the receptacle 32 or is fixed in a lid box of the vehicle 3 so as to be able to carry out communication in a state where a filling nozzle 12 of the hydrogen station 2 is connected to the receptacle 32.

The controller 46 is configured as a microcomputer that includes a CPU, a ROM and a RAM inside, and controls the vehicle 3. The CPU executes a desired computation in accordance with a control program, and carries out various processes and controls. The ROM stores control programs and control data processed in the CPU. The RAM is mainly used as various work areas for control processes. The controller 46 is connected to the pressure sensor 36, the temperature sensor 38, the display 42, the communication instrument 44, and the like. The controller 46 uses the communication instrument 44 to transmit information, which can be acquired by the vehicle 3, for example, information detected by the pressure sensor 36 and the temperature sensor 38, to the hydrogen station 2.

Note that low-voltage auxiliaries, such as the pressure sensor 36, the temperature sensor 38, the display 42 and the communication instrument 44, are supplied with electric power from a low-voltage battery (not shown). Therefore, in a state where the ignition of the vehicle 3 is off, that is, the fuel cell is not generating electricity, the low-voltage auxiliaries and the controller 46 are supplied with electric power from the low-voltage battery.

1-2. Outline of Gas Station

As shown in FIG. 2, the hydrogen station 2 includes a controller 5, a communication instrument 6, a display 7 and an outside air temperature sensor 8. The controller 5 controls various devices located at the hydrogen station 2. The communication instrument 6 is used to carry out communication between the hydrogen station 2 and the vehicle 3. The display 7 displays various pieces of information on its screen. The outside air temperature sensor 8 detects the outside air temperature at a location at which the hydrogen station 2 is installed. The communication instrument 6 is of a type compatible with the communication instrument 44 of the vehicle 3, and transmits or receives various pieces of information to or from the communication instrument 44. The communication instrument 6 is, for example, provided for the filling nozzle 12. The display 7 displays information about the filling flow rate (filling rate), the filling amount, and the like, during gas filling. In addition, the display 7 may have an operation panel for allowing a worker or a user (hereinafter, referred to as "user") to input a desired filling condition on its display screen.

In addition, the hydrogen station 2 includes a gas cylinder bundle (gas supply source) 11, the filling nozzle 12 and a gas flow channel 13. The gas cylinder bundle 11 stores hydrogen gas. The filling nozzle 12 discharges hydrogen gas toward the vehicle-mounted tank 30. The gas flow channel 13 connects the gas cylinder bundle 11 with the filling nozzle 12. The filling nozzle 12 is connected to the receptacle 32 of the vehicle 3 for filling hydrogen gas. In addition, a pressure sensor 9 and a temperature sensor 10 are provided for the filling nozzle 12. The pressure sensor 9 and the temperature sensor 10 respectively detect the pressure and temperature of hydrogen gas that the hydrogen station 2 supplies to the tank 30.

A compressor 14, an accumulator 15, a precooler 16, a flow rate control valve 17, a flow meter 18 and a dispenser 19 are provided in the gas flow channel 13. The compressor 14 compresses hydrogen gas from the gas cylinder bundle 11 and then discharges the compressed hydrogen gas. The accumulator 15 accumulates hydrogen gas compressed by the compressor 14 to a predetermined pressure. The precooler 16 cools hydrogen gas at about room temperature from the accumulator 15 to a predetermined low temperature (for example, −20° C. or −40° C.). The flow rate control valve 17 is an electrically driven valve, and adjusts the flow rate of hydrogen gas from the accumulator 15 in accordance with a command from the controller 5. By so doing, the filling flow rate at which hydrogen gas is filled into the tank 30 is controlled. The thus controlled filling flow rate is measured by the flow meter 18. Then, the controller 5 controls the flow rate control valve 17 in a feedback manner such that the controller 5 receives the measured filling flow rate and then adjusts the filling flow rate to a desired filling flow rate. Note that a flow rate controller other than the flow rate control valve 17 may be used instead. The dispenser 19 pumps hydrogen gas to the filling nozzle 12. For example, as a trigger lever of the filling nozzle 12 is pulled, the dispenser 19 is activated to allow hydrogen gas to be discharged from the filling nozzle 12 toward the tank 30. Note that, although not shown in the drawing, a cut-off valve for opening the gas flow channel 13 during gas filling is provided for the accumulator 15 or at a portion downstream of the accumulator 15.

The controller 5 is formed of a microcomputer that includes a CPU, a ROM and a RAM inside, as in the case of the controller 46. The CPU executes a desired computation in accordance with a control program to carry out various processes and controls. The ROM stores control programs and control data processed in the CPU. The RAM is mainly used as various work areas for control processes. The controller 5 is electrically connected to not only the communication instrument 6, the display 7, the outside air temperature sensor 8, the pressure sensor 9, the temperature sensor 10, the flow rate control valve 17 and the flow meter 18 through control lines indicated by the alternate long and short dashed line in FIG. 2 but also the accumulator 15, and the like. For example, the controller 5 recognizes the pressure and temperature detected respectively by the pressure sensor 36 and the temperature sensor 38 as the pressure and temperature in the tank 30 (that is, the tank pressure and the tank temperature) to control filling of hydrogen gas. Specifically, the controller 5 controls the opening degree of the flow rate control valve 17 on the basis of information about the tank pressure and the tank temperature at the side of the vehicle 3, received from the communication instrument 6. In addition, the controller 5 uses the communication instrument 6 to transmit information, which can be acquired by the hydrogen station 2, to the communication instrument 44 of the vehicle 3.

In the above described gas filling system 1, when hydrogen gas is filled into the vehicle 3, first, the filling nozzle 12 is connected to the receptacle 32, and then the dispenser 19 is activated in this state. Then, hydrogen gas discharged from the filling nozzle 12 is filled into the tank 30. In the gas filling system 1 according to the present embodiment, a gap amount in the tank 30 is acquired before gas filling, and then a load on the liner of the tank 30 is reduced.

2. Structure of Tank

As shown in FIG. 3, the tank 30 includes the liner 53 and a reinforcement layer 55. The liner 53 is formed in a hollow shape such that a storage space 51 is defined inside. The reinforcement layer 55 covers the outer peripheral surface of the liner 53. An end fitting 57 for connecting the valve assembly is provided at at least one end portion of the liner 53 and reinforcement layer 55 in the axial direction.

The liner 53 has a gas barrier characteristic, and suppresses permeation of hydrogen gas to the outside of the liner 53. The material of the liner 53 is not specifically limited. For example, the material of the liner 53 may be not only a metal but also a polyethylene resin, a polypropylene resin or another rigid resin.

The reinforcement layer 55 serves to withstand the pressure of stored hydrogen gas. The reinforcement layer 55 is formed so that fibers impregnated with matrix resin are wound around the outer surface of the liner 53 and then the matrix resin is cured by heating. The matrix resin is, for example, epoxy resin, modified epoxy resin, or the like. The fibers may be carbon fibers or aramid fibers. In addition, the winding method may be a filament winding method (FW method), a tape winding method, or the like. The way of winding in the winding method may be a known hoop winding or a known helical winding.

In the present embodiment, the FW method is used to form the reinforcement layer 55 made of carbon fiber reinforced plastics (CFRP) on the liner 53 made of resin. The CFRP uses a thermosetting epoxy resin as the matrix resin and carbon fibers as the fibers. Note that the reinforcement layer 55 may include a layer other than the CFRP layer laminated on the outer peripheral surface of the liner 53. The layer other than the CFRP layer may be a glass fiber reinforced plastics (CFRP) layer laminated on the outer peripheral surface of the CFRP layer.

3. Relationship between Rate of Discharge of Hydrogen and Tank Pressure and Relationship Between Rate of Discharge of Hydrogen and Tank Temperature FIG. 4A and FIG. 4B are graphs that show a variation in tank pressure and a variation in tank temperature over time when the outside air temperature is 20° C., in which FIG. 4A shows the case where the rate of discharge of hydrogen gas is low, and FIG. 4B shows the case where the rate of discharge of hydrogen gas is high. As is apparent from FIG. 4A and FIG. 4B, as the rate of discharge of hydrogen gas from the tank 30 (the rate of supply of hydrogen gas to the fuel cell) increases, the decreasing rate of the tank pressure increases, and the tank temperature decreases at a higher rate. After completion of discharge of hydrogen gas (time $t_0$), the tank temperature increases by outside air and approaches to the outside air temperature (20° C.). Then, the tank pressure also slightly increases. Note that, in general, as the outside air temperature is low, the tank temperature further decreases.

In the case of the tank 30 equipped for the vehicle 3, hydrogen gas can be filled into the tank 30 at the hydrogen station 2 immediately after discharge of hydrogen gas. Thus, when hydrogen gas is filled into the tank 30, it is presumably highly likely that the tank temperature and the tank pressure are low. At this time, in the case of gas filling immediately after the vehicle has traveled at a high rate of discharge of hydrogen gas (for example, the vehicle has accelerated), the tank temperature and the tank pressure are further low.

Note that, in the case of specifications that the load of hydrogen gas (tank volume) of the tank 30 is reduced, if hydrogen gas of the same amount as that in the case of specifications before the tank volume is reduced is consumed, the decreasing rate of the tank pressure increases. Thus, in the case of specifications that the load of hydrogen gas (tank volume) is reduced, the tank temperature further tends to decrease.

4. Formation of Gap

Figure 5:
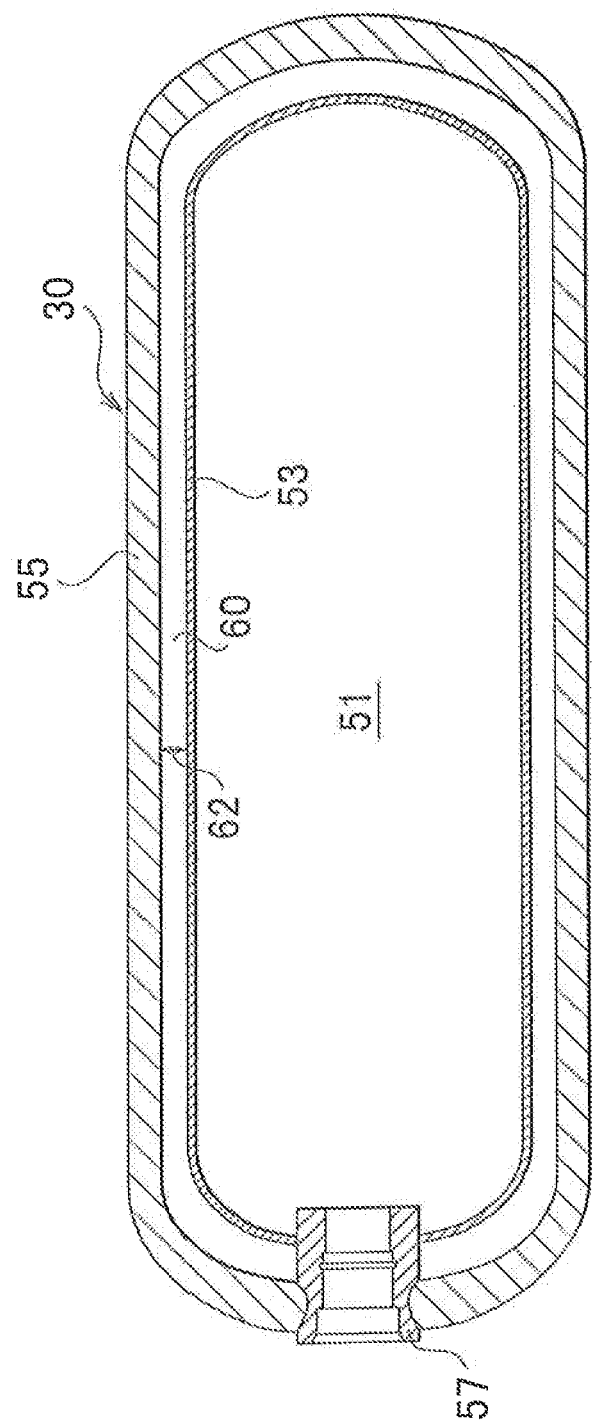
FIG. 5 is a sectional view of the tank shown in FIG. 3, showing a state where a gap is formed between a liner and a reinforcement layer.

FIG. 5 is a sectional view of the tank 30, showing a state where a gap 60 is formed between the liner 53 and the reinforcement layer 55. The reason why the gap 60 is formed will be described.

Firstly, in the following manufacturing process for the tank 30, the gap 60 is formed. Specifically in order to form the reinforcement layer 55, first, carbon fibers impregnated with epoxy resin are wound around the room-temperature liner 53 in which an internal pressure is maintained at such an extent that the liner 53 does not deform by the tension of the FW method. At the stage of completion of the winding, no gap 60 is formed yet. At the subsequent stage, the liner 53 around which the carbon fibers are wound is heated while the internal pressure is maintained to thereby cure the epoxy resin of the CFRP through thermosetting process. Even at this stage, no gap 60 is formed yet. However, after thermosetting process, as the internal pressure is released and the temperature returns to room temperature, the liner 53 contracts. As a result, the gap 60 shown in FIG. 5 is formed. This occurs because the liner 53 tends to more easily contract or expand as compared with the reinforcement layer 55 owing to a difference in modulus of elasticity and coefficient of linear expansion between the liner 53 and the reinforcement layer 55.

Secondly, even when no gap 60 is formed at the manufacturing stage, as a low-pressure condition or a low-temperature condition is satisfied, the gap 60 can be formed. For example, as the tank pressure decreases from a state where no gap is formed as shown in FIG. 3, the gap 60 shown in FIG. 5 is formed. This is because, owing to the difference in modulus of elasticity, and the like, the liner 53 contracts, but the reinforcement layer 55 hardly deforms. Similarly, as the tank temperature decreases from a state where no gap is formed as shown in FIG. 3, the gap 60 shown in FIG. 5 is formed. Then, the size of the gap 60 increases as the tank pressure or the tank temperature decreases. That is, as the rate of discharge of hydrogen gas increases (see FIG. 4A and FIG. 4B), the size of the gap 60 tends to increase.

Figure 6:
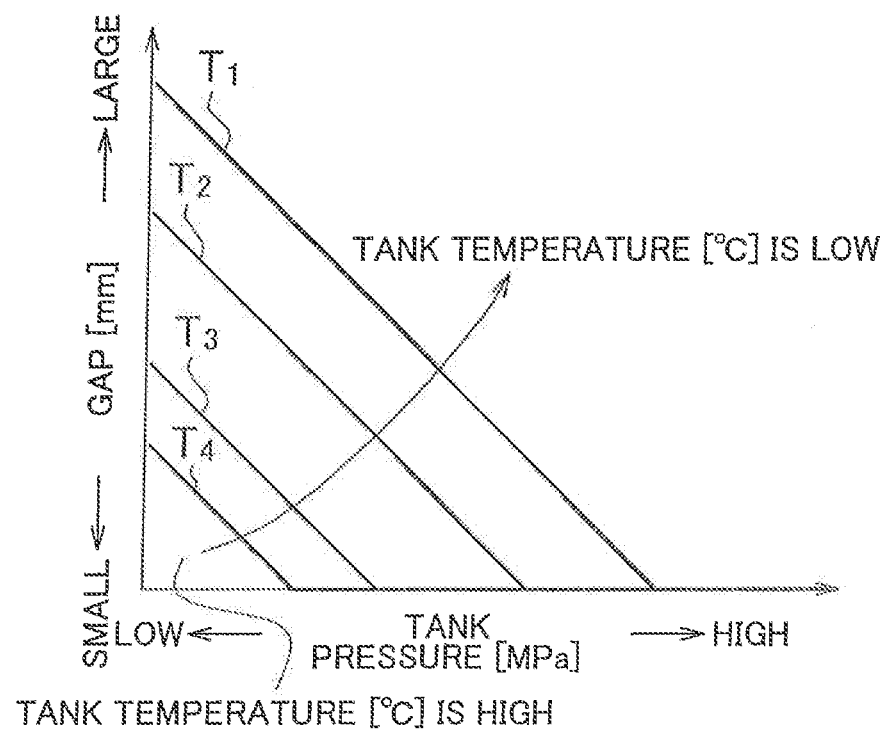
FIG. 6 is a graph that schematically shows the relationship between the size of the gap and the tank pressure for a plurality of tank temperatures.

FIG. 6 is a graph that schematically shows the relationship between the size of the gap 60 and the tank pressure for a plurality of tank temperatures $T_1$ to $T_4$ ($T_1<T_2<T_3<T_4$). As shown in FIG. 6, as long as the tank temperature is the same, as the tank pressure increases, the size of the gap 60 reduces. Similarly, as long as the tank pressure is the same, as the tank temperature increases, the size of the gap 60 reduces. Therefore, even when hydrogen gas is not filled into the tank 30, the gap 60 reduces as the tank temperature increases by the outside air temperature. In addition, it is found that, under the condition that the size of the gap 60 is the same, as the tank temperature decreases, a higher tank pressure is required in order to fill the gap 60.

5. Measurement and Storage of Gap Amount

The size of the gap 60 not only depends on the tank pressure and the tank temperature but also varies depending on the specifications of the tank 30. For example, the size of the gap 60 varies depending on the material that constitutes the tank 30 (the material of the liner 53 and the material of the reinforcement layer 55) or the body size (length, diameter, volume, and the like) of the tank 30.

A gap amount 62 corresponding to the distance between the liner 53 and the reinforcement layer 55 as shown in FIG. 5 is used as an index indicating the size of the gap 60. Note that it is assumed that the gap amount 62 corresponds to the distance between the liner 53 and the reinforcement layer 55 when the gap amount 62 is uniform over all the region of the liner 53 and the reinforcement layer 55, and the gap amount 62 corresponds to the longest distance between the liner 53 and the reinforcement layer 55 when the gap amount 62 is not uniform.

The gap amount 62 may be measured by various methods. For example, the tank 30 is roentgenographed to visualize the inside of the tank 30 to thereby make it possible to measure the gap amount 62 between the liner 53 and the reinforcement layer 55. In addition, in another method, a hole is formed through the reinforcement layer 55 of the tank 30, and a measurement probe of a displacement gauge is inserted through the hole to thereby make it possible to mechanically measure the gap amount 62. Such measurement of the gap amount 62 is performed at the development stage of the tank 30, and the gap amount 62 is not measured by the above described method during gas filling. Thus, in the gas filling system 1, the gap amount 62 of the target tank 30 is already acquired, and is, for example, prepared as a map.

Figure 7:
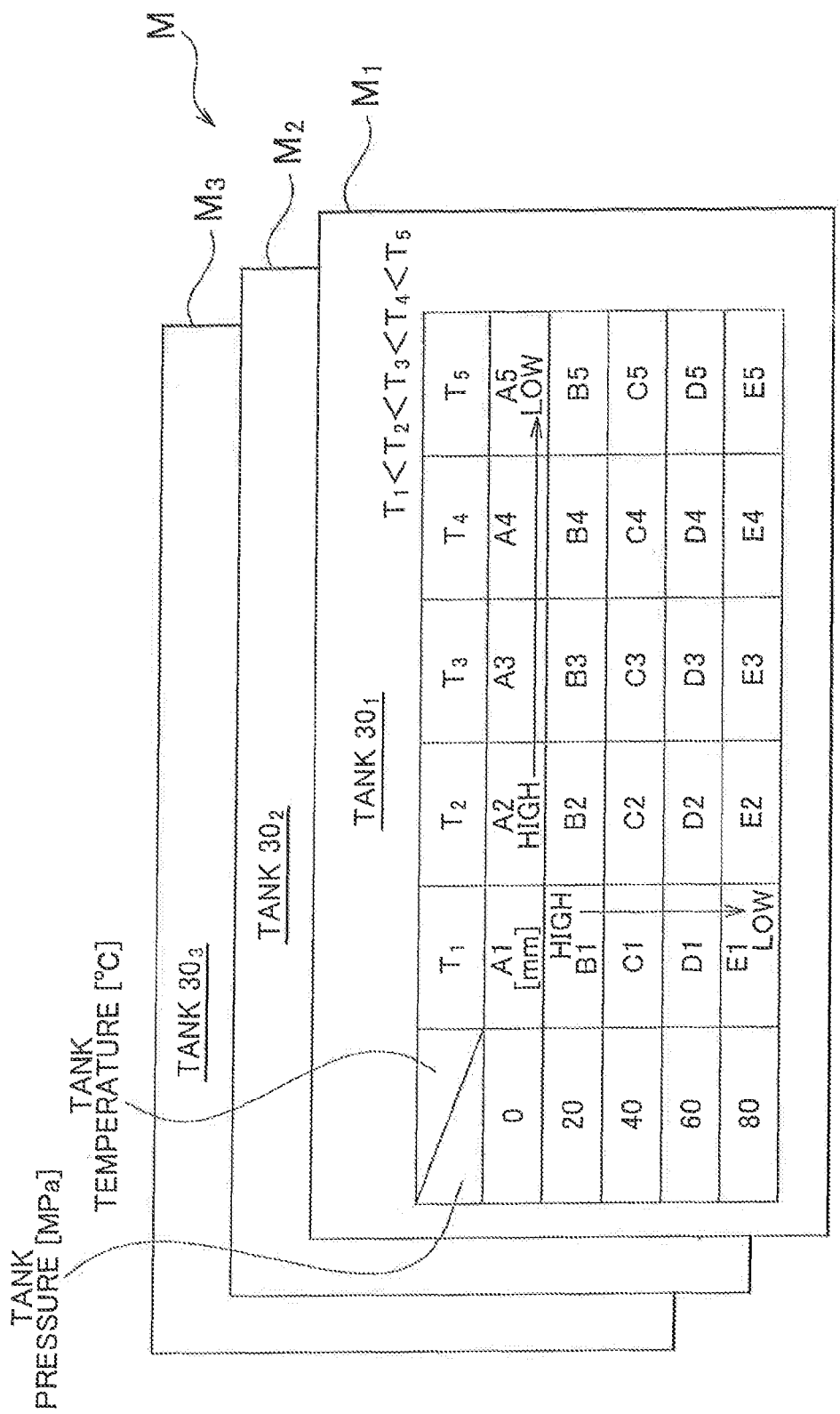
FIG. 7 is a view that shows an example of maps relevant to a gap amount of the tank according to the embodiment.

FIG. 7 is a view that shows an example of maps M relevant to the gap amount 62. As described above, the gap amount 62 varies depending on the specifications of the tank 30, so maps $M_1$ to $M_3$ for the respective specifications (tank $30_1$, tank $30_2$ and tank $30_3$) are prepared. For example, the map $M_1$ and the map $M_2$ differ from each other in the material of the liner 53. In addition, as described above, because the gap amount 62 varies depending on the tank pressure and the tank temperature, each of the maps M relevant to the gap amount 62 defines a gap amount corresponding to each condition with the ordinate axis representing the tank pressure and the abscissa axis representing the tank temperature. For example, at the tank temperature $T_1$, the gap amounts 62 indicated respectively as B1 to E1 in FIG. 7 sequentially reduce as the tank pressure increases. In addition, at the tank pressure 0 MPa, the gap amounts 62 respectively indicated as A2 to A5 in FIG. 7 sequentially reduce as the tank temperature increases.

Here, the maps M are stored in at least one of the storage unit (ROM, and the like) of the controller 46 of the vehicle 3 and the storage unit (ROM, and the like) of the controller 5 of the hydrogen station 2. As will be described in detail later, before filling hydrogen gas into the tank 30, one map M corresponding to the target tank 30 is loaded from the storage unit, and the loaded map M is consulted for the tank pressure and the tank temperature before gas filling. By so doing, the gap amount 62 before gas filling is calculated. Then, on the basis of the calculated gap amount 62, it is predicted whether a load larger than or equal to an allowable amount acts on the liner 53 in gas filling thereafter.

6. Gap Index Value

Figure 8:
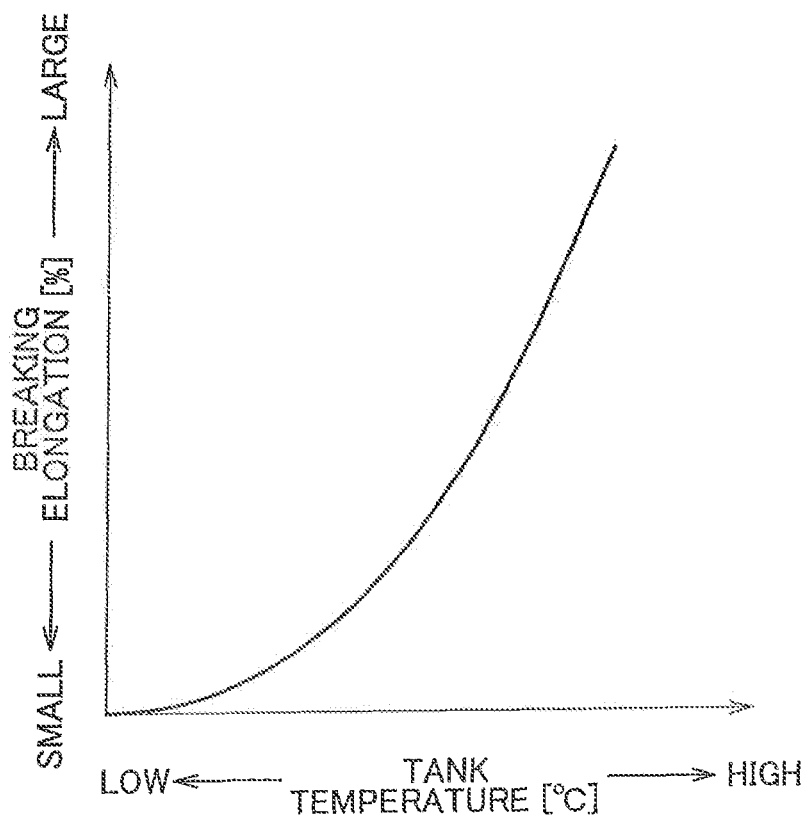
FIG. 8 is a graph that shows the relationship between the tank temperature and the breaking elongation of the liner.

A gap index value is one of indices used in gas filling control in consideration of the gap amount in the following Chapter 7 (see steps S5, S18, and the like, in FIG. 11). The gap index value means the breaking elongation δ of the liner 53 or a value that is obtained by multiplying the breaking elongation δ by a safety factor. The breaking elongation δ is defined by the material property of the liner 53, and varies depending on the tank temperature. Specifically, as shown in FIG. 8, as the tank temperature increases, the breaking elongation δ increases. The gap index value relevant to the tank 30 equipped for the vehicle 3 is prestored in at least one of the storage unit of the controller 46 of the vehicle 3 and the storage unit of the controller 5 of the hydrogen station 2 as in the case of the maps M.

Note that the breaking elongation δ may be obtained from the results of tensile test, and is expressed by the following mathematical expression (1).

$$\delta = 100 \times (l_f - l_0)/l_0 \qquad (1)$$

Here, the meaning of each parameter is as follows.
$l_0$: the initial length of the liner 53
$l_f$: the permanent elongation of the broken liner 53

6-1. Value to be Compared with Gap Index Value

In gas filling control described in the following Chapter 7, a value to be compared with the gap index value is the elongation ε of the liner 53 required to fill the gap 60.

Figure 9B:
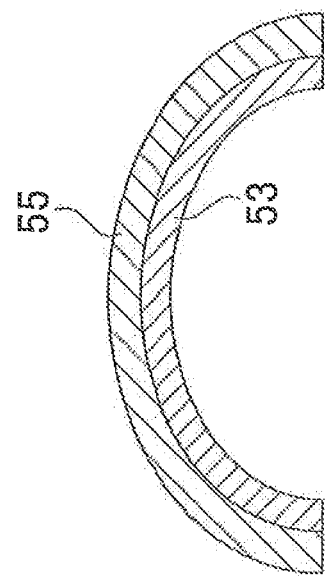
Figure 9A:
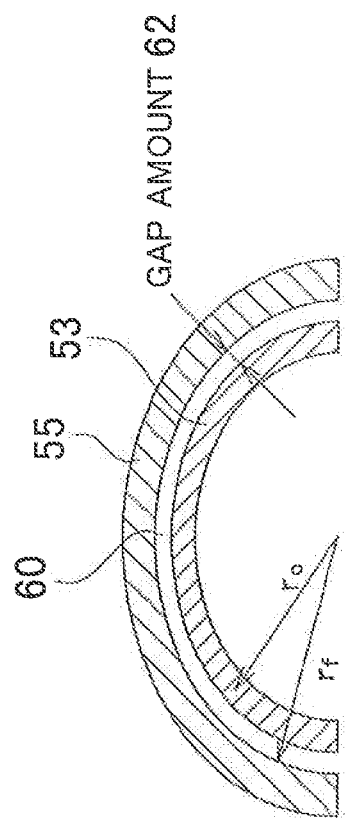

When hydrogen gas is filled into the tank 30 in a state where the gap 60 is formed between the liner 53 and the reinforcement layer 55 as shown in FIG. 9A, the liner 53 expands to fill the gap 60 as shown in FIG. 9B. This is because the tank pressure and the tank temperature increase through gas filling and, therefore, the contracted liner 53 expands until the liner 53 contacts the reinforcement layer 55. The elongation of the liner 53 against the gap 60, that is, the elongation ε of the liner 53 required to fill the gap 60, is, for example, calculated by the following mathematical expression (2).

$$\epsilon = 100 \times (r_f - r_0)/r_0 \qquad (2)$$

Here, the meaning of each parameter is as follows.
$r_0$: the initial outside diameter of the liner 53
$r_f$: the outside diameter of the liner 53 when the gap 60 is filled
For example, when $r_0$ is 50 mm and the gap amount is 5 mm, $r_f$ is 55, so the required elongation ε of the liner 53 is 10%.

In gas filling control, the calculated gap amount 62 and the outside diameter $r_f$ of the liner 53 are known, so the elongation ε required to fill the gap 60 may be calculated from the above mathematical expression (2). Then, the calculated required elongation ε is compared with the gap index value. When the required elongation ε exceeds the gap index value, it is predicted that the load larger than or equal to the allowable amount acts on the liner 53.

Here, the gap index value (predetermined threshold) to be compared with the calculated required elongation ε is the one according to the tank temperature at the time of the comparison. This is because the breaking elongation δ depends on the tank temperature as described above (see FIG. 8). Thus, as the tank temperature increases, the set gap index value also increases.

7. Gas Filling Control in Consideration of Gap Amount

Next, a plurality of examples of control over hydrogen gas filling carried out by the gas filling system 1 in consideration of the gap amount 62 will be described.

7-1. Control for Limiting Filling Flow Rate from Vehicle Side

FIG. 10 is a block diagram that shows functional blocks of the controllers 5 and 46 for implementing the gas filling control. The controller 46 of the vehicle 3 includes a storage unit 70, a gap amount calculating unit 71, a predicting unit 72 and a flow rate determining unit 73. In addition, the controller 5 of the hydrogen station 2 includes an operation control unit 75 that controls filling of hydrogen gas into the tank 30.

The storage unit 70 stores one of the above described maps M, corresponding to the tank 30 equipped for the vehicle 3, and also stores the above described gap index values, and the like, corresponding to the tank 30. The gap amount calculating unit 71 consults the map M of the storage unit 70 for the detected tank pressure and the detected tank temperature to thereby calculate the gap amount 62. The predicting unit 72 predicts whether the load larger than or equal to the allowable amount acts on the liner 53 through hydrogen gas filling on the basis of the calculated gap amount 62. The flow rate determining unit 73 determines the filling flow rate at which hydrogen gas is filled into the tank 30. Particularly, when the predicting unit 72 predicts that the load larger than or equal to the allowable amount acts on the liner 53, the flow rate determining unit 73 determines to limit the filling flow rate. Information about the filling flow rate determined by the flow rate determining unit 73 is transmitted to the hydrogen station 2 via communication between the communication instrument 44 and the communication instrument 6. The operation control unit 75 controls various devices (flow rate control valve 17, and the like) of the hydrogen station 2 so as to achieve the filling flow rate received from the vehicle 3.

FIG. 11 is a flowchart that shows an example of the gas filling control. First, when a fuel cover of a lid box of the vehicle 3 is opened (step S1), the fact that the fuel cover is opened is detected by a sensor not shown), and then the controller 46 of the vehicle 3 starts up (step S2). After that, the pressure sensor 36, the temperature sensor 38 and the communication instrument 44 start up (step S3). To start up these devices, electric power is supplied from the low-voltage battery. Note that detecting connection of the filling nozzle 12 to the receptacle 32 by a sensor may be employed as a trigger for starting up the controller 46, and the like.

Subsequently, the gap amount 62 before gas filling is calculated from the tank pressure and the tank temperature before gas filling, detected by the pressure sensor 36 and the temperature sensor 38 (hereinafter, also referred to as "tank initial pressure" and "tank initial temperature") (step S4). Specifically, because pieces of information about the tank initial pressure and the tank initial temperature are temporarily stored, for example, in the RAM of the controller 46, the gap amount calculating unit 71 consults the map M in the storage unit 70 for the temporarily stored information to thereby calculate the gap amount 62.

In the next step S5, the elongation ϵ of the liner 53 required to fill the gap 60 is calculated on the basis of the calculated gap amount 62, and then it is determined whether the calculated required elongation ϵ falls below the gap index value. Through the determination, it is predicted whether the load larger than or equal to the allowable amount acts on the liner 53 through hydrogen gas filling thereafter. This prediction is carried out by the predicting unit 72, and the gap index value to be compared with the calculated required elongation ϵ is the one according to the tank initial temperature.

As a result, when the calculated required elongation ϵ falls below the gap index value (Yes in step S5), it is predicted that the load larger than or equal to the allowable amount does not act on the liner 53 through hydrogen gas filling, so the process proceeds to the flow of normal hydrogen gas filling (steps S6 to S13). On the other hand, when the calculated required elongation ϵ does not fall below the gap index value (No in step S5), it is predicted that the load larger than or equal to the allowable amount acts on the liner 53 through normal hydrogen gas filling, so the process proceeds to the flow of limiting the filling flow rate (steps S14 to S20).

In the flow of normal hydrogen gas filling, first, a user connects the filling nozzle 12 to the receptacle 32 (step S6). If this work has been already performed, step S6 is skipped. Subsequently, information about the tank initial pressure and the tank initial temperature is transmitted to the controller 5 of the hydrogen station 2 via communication (step S7). The operation control unit 75 of the controller 5 consults a filling rate flow map for the received tank initial pressure and the received tank initial temperature to determine the filling flow rate and then starts gas filling (step S8). Note that the filling flow rate map at least defines the relationship between the tank pressure and the filling flow rate and the relationship between the tank temperature and the filling flow rate, and is stored in the storage unit of the controller 5. During gas filling, the tank pressure and the tank temperature are detected and transmitted where necessary, and the filling flow rate map is consulted for the detected tank pressure and the detected tank temperature to thereby change the filling flow rate.

As a result of gas filling, when gas is fully filled into the tank 30 or is filled into the tank 30 to a desired filling condition specified by the user, gas filling ends (step S9). After that, the user removes the filling nozzle 12 from the receptacle 32 (step S10), and then closes the fuel cover (step S11). Then, the power of the pressure sensor 36, the power of the temperature sensor 38 and the power of the communication instrument 44 turn off (step S12), and the power of the controller 46 turns off (step S13). In this way, a series of flow of normal hydrogen gas filling ends.

On the other hand, in the flow of limiting the filling flow rate, first, when the user has not connected the filling nozzle 12 to the receptacle 32 yet, the user connects the filling nozzle 12 to the receptacle 32 (step S14). Subsequently, in addition to the information about the tank initial pressure and the tank initial temperature, information about the limited filling flow rate, to which the flow rate determining unit 73 determines to limit the filling flow rate, is transmitted to the controller 5 of the hydrogen station 2 via communication (step S15). In response to this, the operation control unit 75 of the controller 5 starts gas filling at the limited filling flow rate determined by the flow rate determining unit 73 (step S16). Note that the limited filling flow rate, to which the flow rate determining unit 73 determines to limit the filling flow rate, is lower than the filling flow rate used at the time of start of gas filling in normal hydrogen gas filling.

During gas filling at the limited filling flow rate, the tank pressure and the tank temperature are detected where necessary, and the gap amount 62 at that moment is calculated (step S17). In addition, the required elongation ϵ of the liner 53 is calculated anew on the basis of the calculated gap amount 62, and then the required elongation ϵ is compared with the gap index value (step S18). As a result, when the required elongation ϵ does not fall below the gap index value (No in step S18), gas filling at the limited filling flow rate is continued (step S19). On the other hand, when the required elongation ϵ falls below the gap index value through gas filling (Yes in step S18), hydrogen gas is filled into the tank 30 without limitations on the filling flow rate (step S20).

That is, during gas filling at the limited filling flow rate, the gap amount calculating unit 71 consults the map M for the tank pressure and the tank temperature during gas filling where necessary to calculate the gap amount 62. In addition, on the basis of the gap amount 62 calculated where necessary, the predicting unit 72 determines whether it is possible to remove limitations on the filling flow rate. As a result, when it is determined that it is possible to remove limitations on the filling flow rate, a signal that indicates to remove limitations on the filling flow rate is transmitted to the hydrogen station 2 via communication, and the operation control unit 75 switches from gas filling at the limited filling flow rate to normal hydrogen gas filling that consults the filling flow rate map.

In an example of such steps S16 to S20, during a period from the start of gas filling through expansion of the liner 53 to when the gap amount 62 becomes zero, hydrogen gas is filled into the tank 30 at the limited filling flow rate. Then, after the gap amount 62 becomes zero through the gas filling, hydrogen gas is filled into the tank 30 without limitations on the filling flow rate. This is because, when the gap amount 62 is zero, no expansion of the liner 53 occurs any more and the load larger than or equal to the allowable amount does not act on the liner 53. Note that, in another example, when it is predicted that the load larger than or equal to the allowable amount does not act on the liner 53 during the above period, limitations on the filling flow rate may be removed. Note that a further specific example of control for limiting the filling flow rate will be described in the following Chapter 7-3.

With the above described gas filling control, the gap amount 62 in the tank 30 is calculated before gas filling, it is predicted whether the load larger than or equal to the allowable amount acts on the liner 53 through gas filling, and, when it is predicted that the load larger than or equal to the allowable amount acts on the liner 53, hydrogen gas is filled into the tank 30 at the limited filling flow rate. By so doing, it is possible to suppress the deformation speed (expansion speed) of the liner 53 during gas filling, so it is possible to reduce a load on the liner 53. In addition, in comparison with the case where gas filling is prohibited and an increase in tank temperature by the outside air temperature is waited, the gap 60 may be filled in a short period of time.

Furthermore, even when the filling flow rate is limited, hydrogen gas is filled into the tank 30 without limitations on the filling flow rate after the gap 60 is filled, so it is possible to reduce a period of time for gas filling as a whole. On the other hand, when it is predicted that the load larger than or equal to the allowable amount does not act on the liner 53, the filling flow rate is not limited, so it is possible to perform quick gas filling. That is, with the gas filling control, only when the required elongation ϵ falls at or above the gap index value, the filling flow rate is limited, so it is possible to achieve both reduction in load on the liner 53 and reduction in period of time for gas filling.

In addition, at the side of the vehicle 3, it is determined whether to limit the filling flow rate and then that information is transmitted to the side of the hydrogen station 2, so it is possible to execute control so as to limit the filling flow rate at the side of the vehicle 3. By so doing, the prestored map M and the prestored gap index values may be just the ones that correspond to the tank 30 equipped for the vehicle 3. In other words, the hydrogen station 2 does not need to store maps M and gap index values corresponding to tanks of all vehicles or update the software.

7-2. Control for Limiting Filling Flow Rate from Gas Station Side

Next, an example in which the hydrogen station 2 takes the initiative to execute the gas filling control in the above Chapter 7-1 will be described with reference to FIG. 12 and FIG. 13. Note that the description similar to that of the above Chapter 7-1 is omitted where appropriate.

Figure 12:
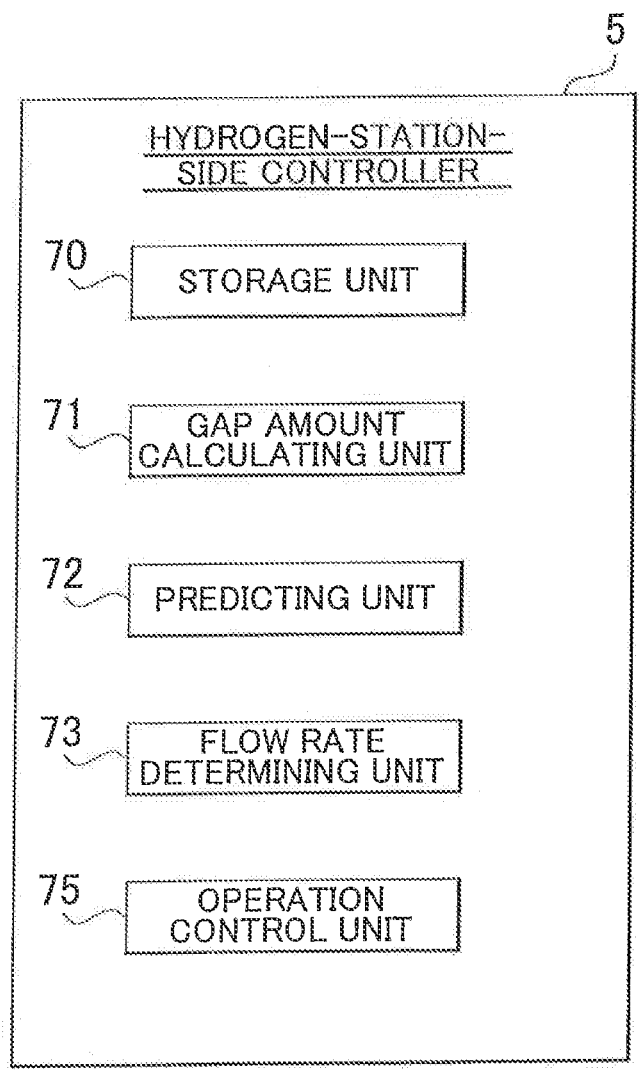
FIG. 12 is a functional block diagram for implementing control for limiting the filling flow rate from a gas station side in the gas filling method according to the embodiment.

FIG. 12 is a block diagram that shows functional blocks of the controller 5 of the hydrogen station 2 for implementing the gas filling control. The controller 5 includes not only the operation control unit 75 but also the storage unit 70, the gap amount calculating unit 71, the predicting unit 72 and the flow rate determining unit 73 that are shown as the functional blocks at the side of the vehicle 3 in FIG. 10. In this case, the storage unit 70 stores maps M and gap index values for tanks 30 that are likely to be filled at the hydrogen station 2.

Figure 13:
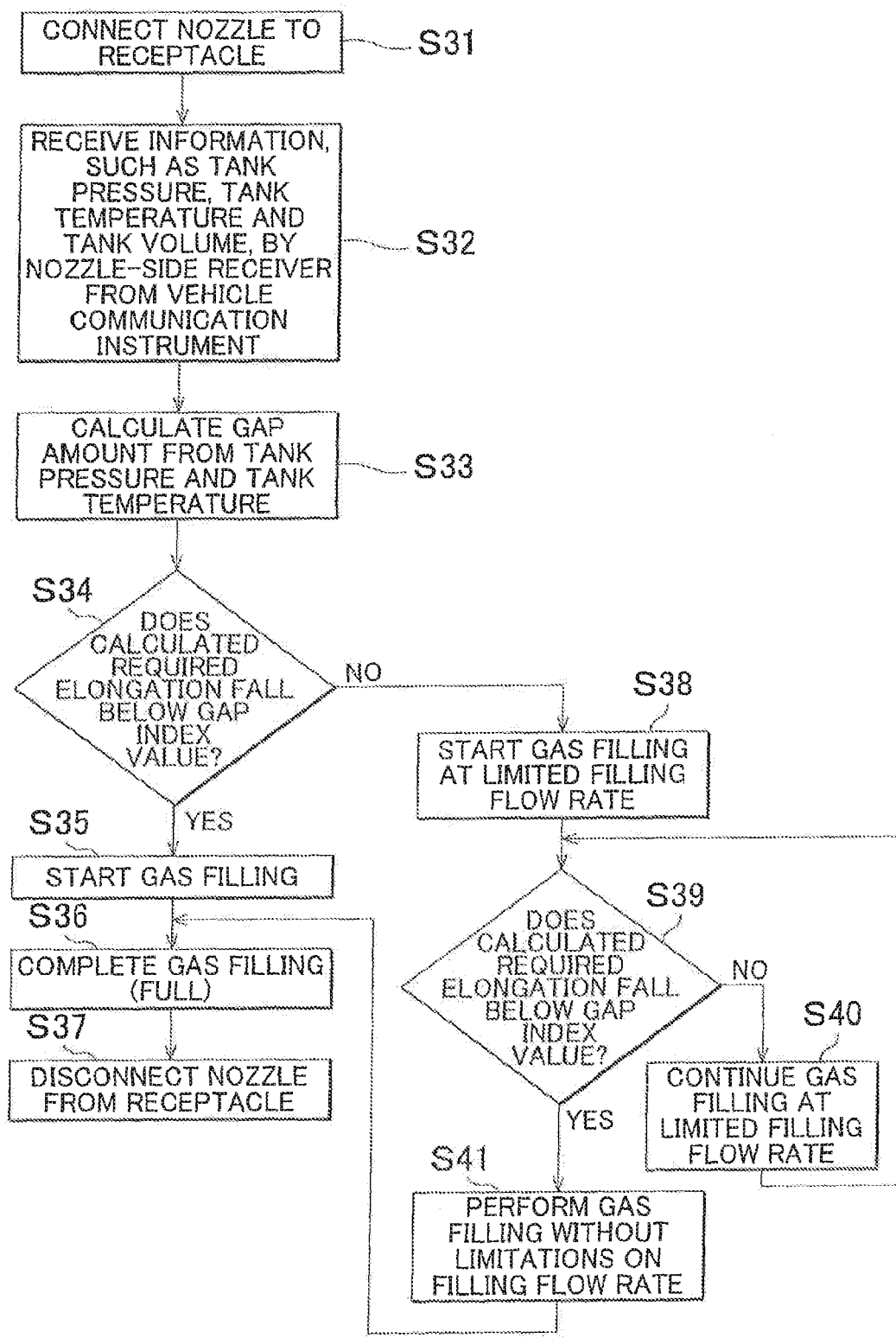
FIG. 13 is a flowchart that shows an example of the control shown in FIG. 12.

FIG. 13 is a flowchart that shows an example of control executed by the hydrogen station 2. First, the user connects the filling nozzle 12 to the receptacle 32 (step S31). Then, at the side of the vehicle 3, the pressure sensor 36, the temperature sensor 38, the communication instrument 44 and the controller 46 start up (see steps S2 and S3 in FIG. 11), and the tank initial pressure and the tank initial temperature are detected by the pressure sensor 36 and the temperature sensor 38. The detected pieces of information about the tank initial pressure and the tank initial temperature are temporarily stored, for example, in the RAM of the controller 46.

Subsequently, the communication instrument 6 at the side of the filling nozzle 12 receives the pieces of information about the tank initial pressure and the tank initial temperature from the communication instrument 44 at the side of the vehicle 3 (step S32). That is, the communication instrument 6 of the hydrogen station 2 functions as an information acquisition unit that acquires results detected by the pressure sensor 36 and the temperature sensor 38 provided for the vehicle 3 as information about the tank pressure and the tank temperature via communication. At the time of receiving the information, the communication instrument 6 also receives information about the specifications of the tank 30, such as the volume of the tank 30.

After that, in the hydrogen station 2, the gap amount calculating unit 71 consults one of the maps M, corresponding to the tank 30 and stored in the storage unit 70, for the received pieces of information about the tank initial pressure and the tank initial temperature to thereby calculate the gap amount 62 (step S33). Then, as in the case of the above, on the basis of the calculated gap amount 62, the predicting unit 72 calculates the elongation ϵ of the liner 53 required to fill the gap 60 and then compares the calculated required elongation ϵ with the gap index value (step S34).

When the required elongation ϵ falls below the gap index value (Yes in step S34), the process proceeds to the flow of normal hydrogen gas filling as in the case of the above (steps S35 and S36). Eventually, this flow ends when the user disconnects the filling nozzle 12 from the receptacle 32 (step S37).

On the other hand, when the required elongation ϵ does not fall below the gap index value (No in step S34), the process proceeds to the flow of limiting the filling flow rate as in the ease of the above (steps S38 to S40). At this time, the operation control unit 75 starts gas filling at the limited filling flow rate to which the flow rate determining unit 73 determines to limit the filling flow rate (step S38). Then, during gas filling as well, the required elongation ϵ calculated where necessary is compared with the gap index value as in the case of the above (step S39). When the required elongation ϵ falls below the gap index value (Yes in step S39), limitations on the filling flow rate are removed (step S41) and normal gas filling is performed; whereas, when the required elongation ϵ does not fall below the gap index value (No in step S39), gas filling is continued at the limited filling flow rate (step S40).

Although it is omitted in FIG. 13, step S39 is based on the precondition that, during gas filling, the detected tank pressure and the detected tank temperature are transmitted to the hydrogen station 2 via communication, and, at the hydrogen station 2, the real-time gap amount 62 is calculated (similar to step S17 in FIG. 11), and the required real-time elongation ϵ is calculated from the calculated gap amount 62.

Even with the above described gas filling control, as in the case of the gas filling control described in Chapter 7-1, it is possible to achieve both reduction in load on the liner 53 during gas filling and reduction in period of time for gas filling. Particularly, with the gas filling control, it is possible to execute control so as to limit the filling flow rate under the initiative of the side of the hydrogen station 2, so it is not necessary to provide a determining function for the side of the vehicle 3.

7-3. Specific Example of Control for Limiting Filling Flow Rate

Figure 14:
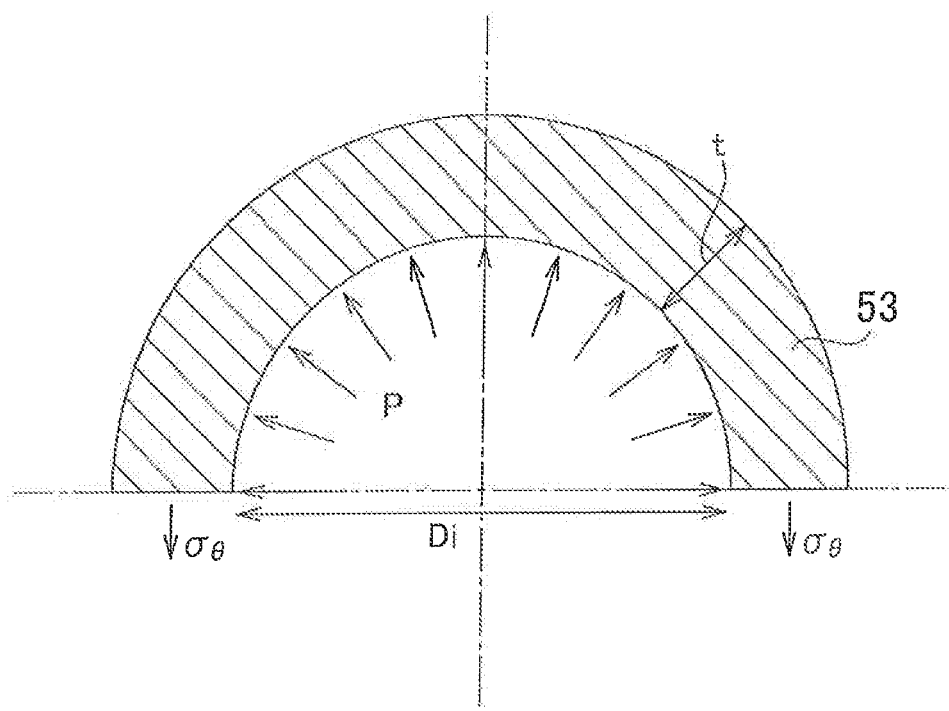
FIG. 14 is a view that shows a model for obtaining a liner deformation speed.
Figure 15B:
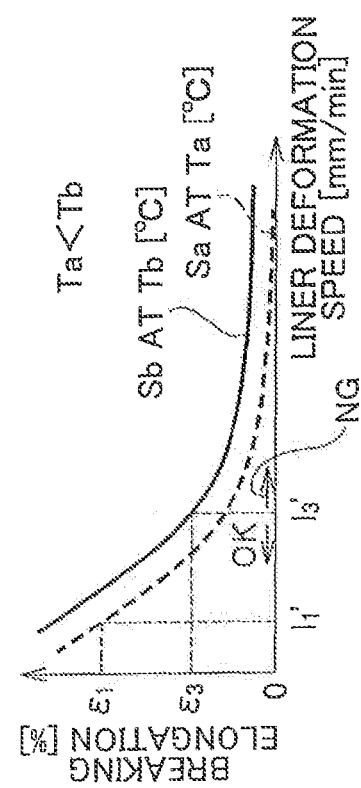

Next, a specific example of control for limiting the filling flow rate will be described with reference to FIG. 14 to FIG. 15B. The example of control is executed when the required elongation $\epsilon$ falls at or above the gap index value (for example, steps S14 to S20 in FIG. 11 and steps S38 to S41 in FIG. 13). In the example of control, a map that defines the relationship between the liner deformation speed and the breaking elongation as shown in FIG. 15 is consulted for the required elongation $\epsilon$ to be compared with the gap index value, and, by so doing, the filling flow rate is limited so as to achieve the liner deformation speed that is lower than the liner deformation speed at which the load larger than or equal to the allowable amount acts on the liner 53. Note that the liner deformation speed means the speed at which the liner 53 expands to fill the gap 60. In addition, the breaking elongation is the breaking elongation $\delta$ of the liner 53, and is a reference value of the gap index value as described above.

First, a method of obtaining the liner deformation speed will be described with reference to the model shown in FIG. 14. In this model, it is assumed that the liner 53 is a thin-walled cylindrical pressure vessel, and the liner deformation speed l' in the circumferential direction (liner deformation amount in the circumferential direction per unit time) is obtained. In this mode, the following mathematical expressions (3) and (4) hold on the basis of the definition of strain. In addition, the following mathematical expression (5) holds on the basis of the equilibrium of force in the radial direction, and, in addition, the following mathematical expression (6) holds by the equation of state for gas.

$$l' = \epsilon' D_i \quad (3)$$

$$\epsilon' = \sigma_\theta'/E \quad (4)$$

$$\sigma_\theta' = p'D_i/2t \quad (5)$$

$$p' = n'RT/V \quad (6)$$

The meaning of each parameter is as follows.
l': liner deformation amount in the circumferential direction per unit time [m/min]
$\epsilon'$: liner strain increase in the circumferential direction per unit time [1/min]
$\sigma_\theta'$: stress increase in the circumferential direction per unit time [Pa/min]
$D_i$: liner inside diameter [m]
t: liner thickness [m]
E: the modulus of elasticity of the liner [Pa]
p': liner internal pressure increase [Pa/min]
n': filling amount per unit time [mol/min]
R: gas constant of hydrogen gas [J/(mol•K)]
T: tank temperature [K]
V: tank volume (liner volume) [m³]

From the above mathematical expressions (3) to (6), the liner deformation speed l' may be expressed as follows.

$$l' = D_i^2 n'RT/2EtV \quad (7)$$

Figure 15A:
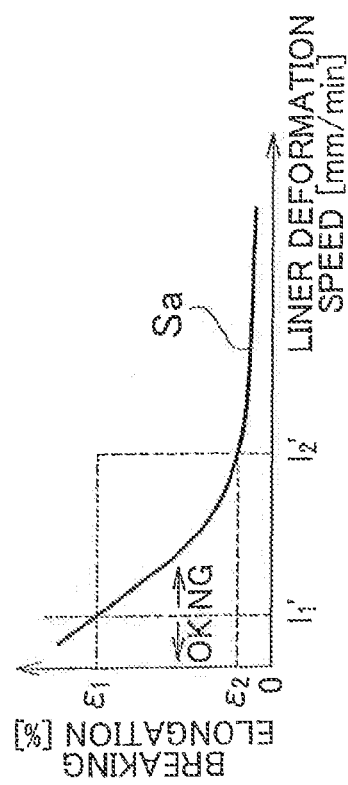

As shown in the mathematical expression (7), it is found that the liner deformation speed l' may be calculated from the filling amount per unit time n', that is, the filling flow rate. FIG. 15A and FIG. 15B are an example of maps that show the relationship between the thus calculated liner deformation speed l' and the breaking elongation $\delta$ for the tank 30 according to the present embodiment.

FIG. 15A shows the map that defines the relationship between the liner deformation speed l' and the breaking elongation $\delta$ for one tank temperature, in which the ranges on both sides of the curve Sa differ in presence or absence of breakage of the liner 53. That is, when the liner 53 expands at the liner deformation speed l' that falls within the range higher than the curve Sa, the liner 53 breaks; whereas, even when the liner 53 expands at the liner deformation speed l' that falls within the range lower than the curve Sa, the liner 53 does not break.

An example of limiting the filling flow rate will be described. First, if normal hydrogen gas filling (without limitations on the filling flow rate) is performed (see step S8 in FIG. 11 and step S35 in FIG. 13) when the required elongation $\epsilon$ of the liner 53, calculated before gas filling, is $\epsilon_1$, the liner deformation speed becomes a liner deformation speed $l_2'$, and the load larger than or equal to the allowable amount acts on the liner 53. In contrast to this, in order to limit the filling flow rate so that the load larger than or equal to the allowable amount does not act on the liner 53, the liner deformation speed should be lower than the liner deformation speed $l_1'$. The maximum value ($n_{max}'$) of the limited filling flow rate may be expressed as follows when the above mathematical expression (7) is converted, so hydrogen gas is filled into the tank 30 so as not to exceed the maximum value ($n_{max}'$).

$$n_{max}' = 2EtV \cdot l_1'/D_i^2 RT$$

Here, as is understood from FIG. 15A, the maximum value of the liner deformation speed l', which may be used during gas filling, varies depending on the required elongation $\epsilon$ calculated before gas filling. This means that the limited amount or maximum value of the filling flow rate varies depending on the required elongation $\epsilon$ calculated before gas filling or the gap amount 62. For example, when the required elongation $\epsilon$ before gas filling is $\epsilon_2$, the load larger than or equal to the allowable amount does not act on the liner 53 even when a larger liner deformation speed (at most $l_2'$) is used in comparison with the case where the required elongation $\epsilon$ before gas filling is $\epsilon_1$ ($>\epsilon_2$), so the filling flow rate may be increased (the limited amount may be reduced).

FIG. 15B shows the curve Sa for the tank temperature Ta and the curve Sb for the tank temperature Tb (where Ta<Tb) as a map that defines the relationship between the liner deformation speed l' and the breaking elongation $\delta$. When the map is consulted for the required elongation $\epsilon$ calculated before gas filling, the curve Sa is used when the tank temperature is Ta, and the curve Sb is used when the tank temperature is Tb. That is, when the tank temperature is high, the maximum value of the liner deformation speed l', which may be used during gas filling, increases, so the filling flow rate may be increased (the limited amount may be reduced).

The filling flow rate may be increased while the filling flow rate is limited. This is because the tank temperature increases owing to gas filling and, therefore, the maximum value of the liner deformation speed l', Which may be used during gas filling, increases. One example will be described with reference to FIG. 15B. When the subsequent condition (the required elongation $\epsilon$ is $\epsilon_2$, and the tank temperature is Tb) is established as a result of filling hydrogen gas at the liner deformation speed $l_1'$ under the condition before gas filling (the required elongation ϵ is $\epsilon_1$, and the tank temperature is Ta), hydrogen gas may be filled into the tank 30 at the liner deformation speed $l_2'$ that is higher than the liner deformation speed $l_1'$. Thus, during gas filling at the limited filling flow rate, before removing the limitations (see step S20 in FIG. 11, and step S41 in FIG. 13), the filling flow rate may be increased so as to increase the liner deformation speed to continue gas filling.

As described above, by limiting the filling flow rate focusing on the liner deformation speed, it is possible to perform gas filling as quick as possible at the liner deformation speed at which the load larger than or equal to the allowable amount does not act on the liner 53. Note that, to limit the filling flow rate in the example of control, the limited amount of the filling flow rate is determined by the flow rate determining unit 73 depending on the calculated required elongation ϵ, the calculated gap amount 62 and the tank temperature, and the filling flow rate is limited by the operation control unit 75 during gas filling.

7-4. Limiting Filling Flow Rate to Zero

Next, an example of control in which the filling flow rate is limited to zero as a result of considering the gap amount 62 for hydrogen gas filling will be described.

(1) Control from Vehicle Side

Figure 16:
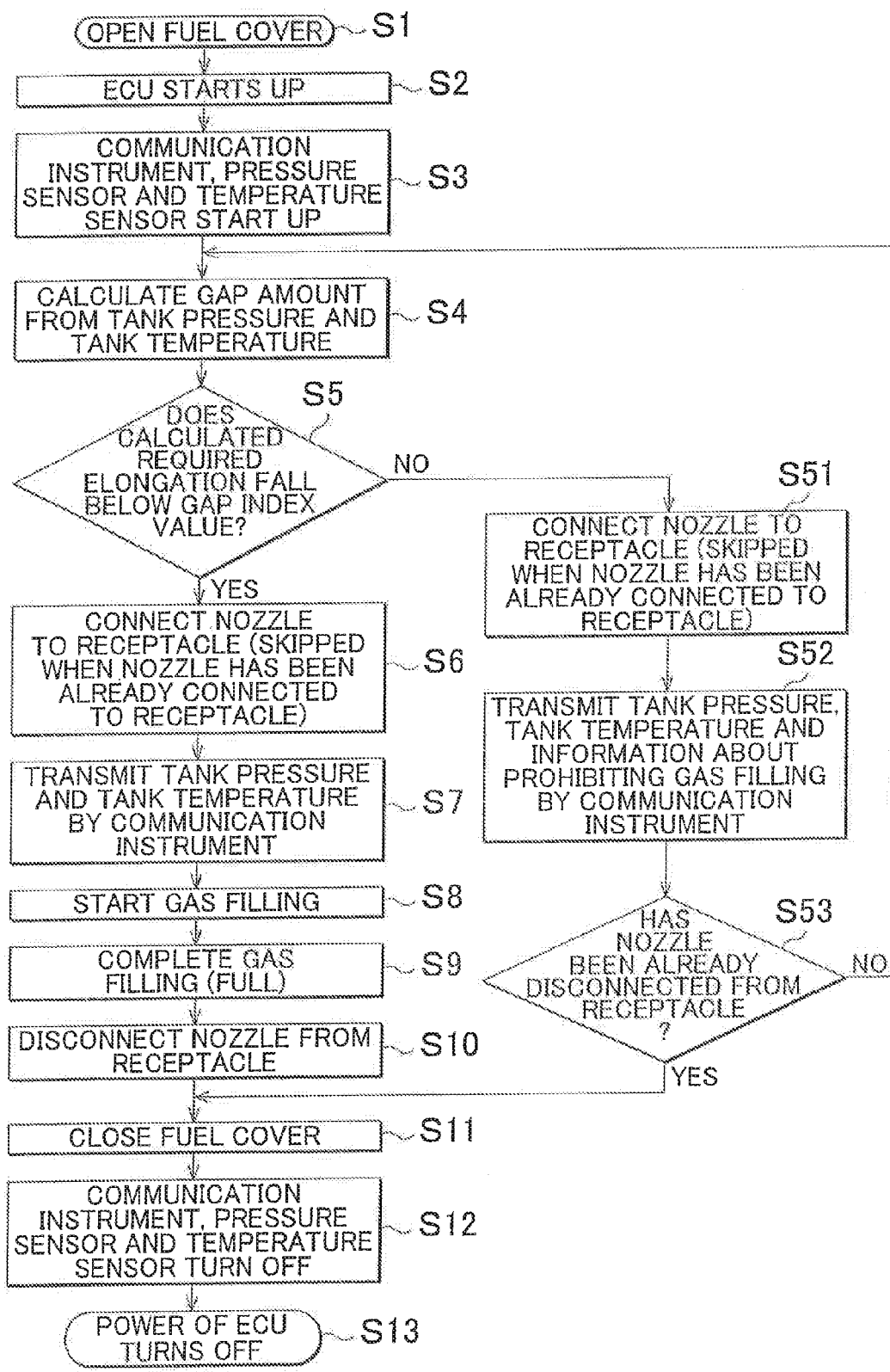
FIG. 16 is a flowchart that shows an example of control for limiting the filling flow rate to zero from a vehicle side in the gas filling method according to the embodiment.

FIG. 16 is a flowchart that shows an example of executing control from the side of the vehicle 3 so as to prohibit gas filling. The difference from FIG. 11 described in the above Chapter 7-1 is that steps S51 to S53 are employed instead of steps S14 to S20 in FIG. 11. Note that functional blocks for implementing the gas filling control are the same as those shown in FIG. 10.

As shown in FIG. 16, when the calculated required elongation ϵ does not fall below the gap index value (No in step S5), the flow rate determining unit 73 at the side of the vehicle 3 determines to limit the filling flow rate to zero and then the process proceeds to the flow of prohibiting gas filling (steps S51 to S53). In the flow of prohibiting gas filling, first, if the user has not connected the filling nozzle 12 to the receptacle 32 yet, the user connects the filling nozzle 12 to the receptacle 32 (step S51).

Subsequently, information about the tank initial pressure and the tank initial temperature is transmitted from the side of the vehicle 3 to the side of the hydrogen station 2 via communication, and information about the limited filling flow rate, to which the flow rate determining unit 73 determines to limit the filling flow rate, that is, information about prohibiting gas filling, is transmitted to the side of the hydrogen station 2 via communication (step S52). In response to this, the operation control unit 75 at the side of the hydrogen station 2 does not start gas filling. Here, a signal that indicates information about prohibiting gas filling is a signal that indicates that gas filling is disapproval or a signal that indicates to temporarily stop gas filling (wait start of gas filling).

After that, when a sensor (not shown) recognizes that the user has disconnected the filling nozzle 12 from the receptacle 32 (Yes in step S53), the power of the controller 46, and the like, eventually turns off, and the process ends without filling hydrogen gas (steps S11 to S13). On the other hand, until the sensor recognizes disconnection of the filling nozzle 12 (No in step S53), the gap amount 62 is calculated where necessary to obtain the required elongation ϵ, and then the required elongation ϵ is compared with the gap index value (steps S4 and S5). Because there is a possibility that the tank temperature, or the like, increases owing to a lapse of time and, as a result, the required elongation ϵ falls below the gap index value, determination as to whether to fill hydrogen gas into the tank 30 is retried until the filling nozzle 12 is disconnected.

With the above described gas filling control, when it is predicted that the load larger than or equal to the allowable amount acts on the liner 53 through gas filling, gas filling is prohibited, so it is possible to suppress a load on the liner 53.

Note that, when gas filling is prohibited, the user may be notified of the fact that gas filling is prohibited. A notification timing may be the time when it is determined that the required elongation ϵ falls at or above the gap index value (No in step S5), the time when the filling nozzle 12 has been connected to the receptacle 32 (step S51), the time when information about prohibiting gas filling is transmitted via communication (step S52) or not the time immediately after the information about prohibiting gas filling is transmitted but the time when a predetermined period of time (for example, 30 seconds) has elapsed after the information about prohibiting gas filling is transmitted. In addition, when the notification is performed, not only a method of displaying information about prohibiting gas filling on the display 42 of the vehicle 3 or the display 7 of the hydrogen station 2 but also a method of sounding an alarm. Note that, when the notification is performed at the hydrogen station 2, a signal that indicates to prohibit gas filling may be included in a transmission signal at the time of the transmission in step S52.

(2) Control from Gas Station Side

Figure 17:
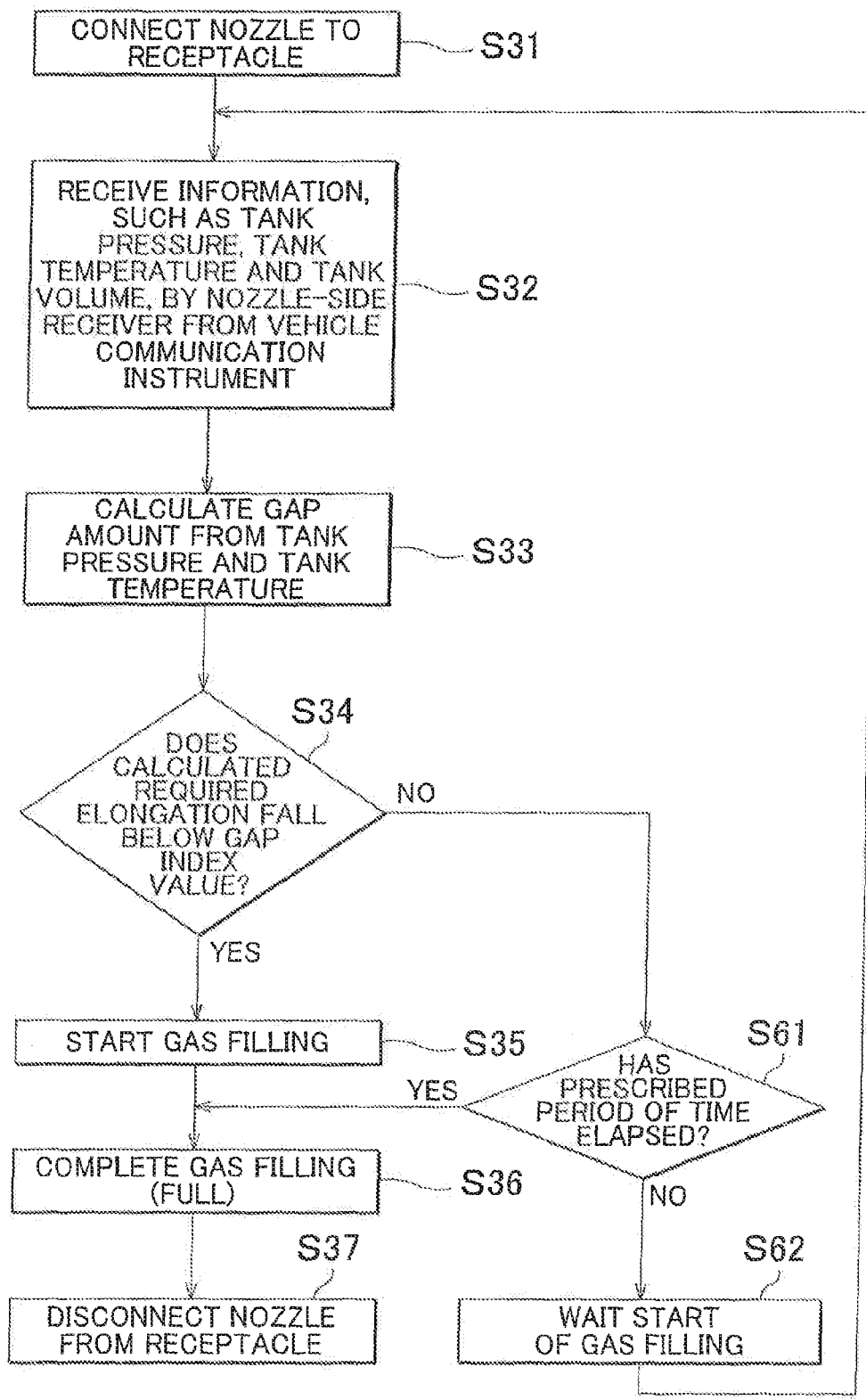
FIG. 17 is a flowchart that shows an example of control for limiting the filling flow rate to zero from a gas station side in the gas filling method according to the embodiment.

FIG. 17 is a flowchart that shows an example of executing control from the side of the hydrogen station 2 so as to prohibit gas filling. The difference from FIG. 13 described in the above Chapter 7-2 is that steps S61 and S62 are employed instead of steps S38 to S41 in FIG. 13. Note that functional blocks for implementing the gas filling control are the same as those shown in FIG. 12.

As shown in FIG. 17, when the required elongation ϵ does not fall below the gap index value in step S34), the flow rate determining unit 73 at the side of the hydrogen station 2 determines to limit the filling flow rate to zero and then the process proceeds to the flow of prohibiting gas filling (steps S61 and S62). In the flow of prohibiting gas filling, when a prescribed period of time has elapsed (Yes in step S61), the process ends without filling hydrogen gas (steps S36 and S37). On the other hand, until the prescribed period of time elapses (No in step S61), the control is handled as waiting start of gas filling (step S62). Then, once again, the required elongation ϵ is obtained by calculating the gap amount 62, and then it is determined whether the required elongation ϵ falls below the gap index value (steps S32 and S33). This is because there is a possibility that the tank temperature, or the like, increases owing to a lapse of time and, as a result, the required elongation ϵ falls below the gap index value as described above.

Here, the prescribed period of time in step S61 may be set to a selected value (for example, 30 seconds or one minute). The prescribed period of time may be a fixed value or may be variable in response to the outside air temperature. In addition, the start of the predetermined period of time may be set to the timing at which the filling nozzle 12 has been connected to the receptacle 32 (at the time of completion of step S31) or may be set to the timing at which information about the tank initial temperature, the tank initial pressure, and the like, is received via communication (at the time of completion of step S32). The start of the predetermined period of time may be set appropriately.

Even with the above described gas filling control, when it is predicted that the load larger than or equal to the allowable amount acts on the liner 53 through gas filling, gas filling is prohibited, so it is possible to suppress a load on the liner 53.

Note that, when gas filling is prohibited, it is desirable to notify the user that gas filling is prohibited by means of a display shown by the display 7 or 42 or an alarm as in the case of the above (1). In this case, it is applicable that the notification is provided when the prescribed period of time has elapsed (Yes in step S61). In addition, when the notification is provided at the side of the vehicle 3, it is applicable that a signal that indicates that gas filling is prohibited is transmitted from the hydrogen station 2 to the vehicle 3.

(3) Another Example of Providing Notification that Gas Filling is Prohibited

Figure 18:
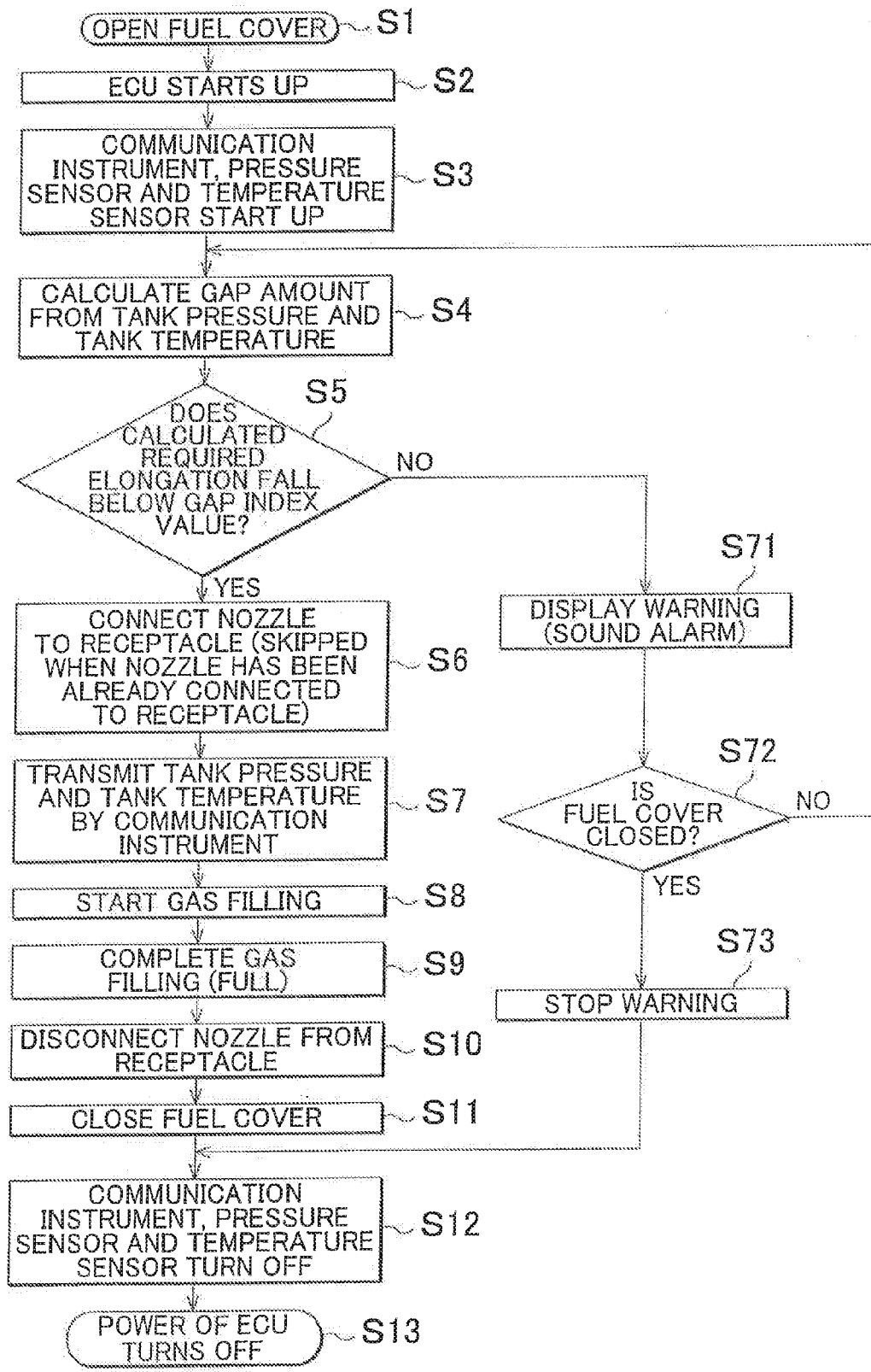
FIG. 18 is a flowchart that shows an example of control for issuing a warning from a vehicle side to prohibit gas filling in the gas filling method according to the embodiment.

FIG. 18 is a flowchart that shows an example of executing control for outputting a warning from the side of the vehicle 3 so as to prohibit gas filling. The major difference from FIG. 16 is that steps S71 to S73 are employed instead of steps S51 to S53 in FIG. 16.

As shown in FIG. 18, when the process proceeds to the flow of prohibiting gas filling (steps S71 to S73) because the required elongation ϵ falls at or above the gap index value (No in step S5), the display 42 of the vehicle 3 displays a warning to prohibit gas filling (step S71). An example of the warning display is, for example, "conduct gas filling when the tank temperature is higher than or equal to XX° C.". Note that, instead of the warning display, an alarm may be sounded from a warning device (not shown) of the vehicle 3.

After that, when the user closes the fuel cover (Yes in step S72), the warning is stopped (step S73). When the power of the controller 46, and the like, eventually turns off, the process ends without filling hydrogen gas (steps S11 to S13). On the other hand, until the fuel cover is closed (No in step S72), the gap amount 62 is calculated to obtained the required elongation ϵ again, and the required elongation ϵ is compared with the gap index value (steps S4 and S5). This is because there is a possibility that the tank temperature, or the like, increases owing to a lapse of time and, as a result, the required elongation ϵ falls below the gap index value.

In this way, with the example of gas filling control, when it is predicted that the load larger than or equal to the allowable amount acts on the liner 53 through gas filling, it is possible to prompt the user to prohibit gas filling from the side of the vehicle 3, so it is possible to suppress a load on the liner 53. Such a method of prohibiting gas filling is particularly useful when it is impossible to establish communication between the hydrogen station 2 and the vehicle 3. Note that the action of closing the fuel cover is used as a trigger for stopping a warning; however, the configuration is not limited to this.

The gas filling method, the gas filling system, the gas station and the vehicle according to the aspects of the invention are not limited to application of hydrogen gas, but they may be applied to another fuel gas, such as natural gas. In addition, the gas filling method, the gas filling system, the gas station and the vehicle may be not only applied to a vehicle but also applied to a mobile unit equipped with a tank as a gas filling destination from an outside, such as an aircraft, a ship and a robot.

In the above embodiment, the gap amounts 62 are loaded as a map M at the time of start of gas filling to execute control; instead, it may be designed so that the above control is executed only by acquiring information about the tank pressure and the tank temperature.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A gas filling method for filling gas into a tank having a liner and a reinforcement layer formed on an outer peripheral surface of the liner, comprising:
    detecting a tank pressure and a tank temperature;
    calculating an amount of a gap between the liner and the reinforcement layer before filling the gas into the tank on the basis of the tank pressure and the tank temperature and a prestored map;
    calculating an elongation of the liner that is required to bring the calculated gap amount to zero and determining whether the calculated elongation falls below a predetermined threshold;
    predicting whether a load larger than or equal to an allowable amount acts on the liner by the gas filling on the basis of the calculated elongation; and
    when it is predicted that the load larger than or equal to the allowable amount acts on the liner, limiting a filling flow rate at which the gas is filled into the tank in comparison with a case where it is predicted that the load larger than or equal to the allowable amount does not act on the liner.

2. The gas filling method according to claim 1, wherein limiting the filling flow rate includes filling the gas into the tank at a limited filling flow rate during at least part of a first period of time during which the liner deforms by the gas filling to bring the amount of gap to zero.

3. The gas filling method according to claim 2, further comprising filling the gas into the tank without limitations on the filling flow rate after a lapse of at least the first period of time.

4. The gas filling method according to claim 2, wherein, when the calculated elongation of the liner exceeds the predetermined threshold, predicting that the load larger than or equal to the allowable amount acts on the liner.

5. The gas filling method according to claim 4, wherein the predetermined threshold is a breaking elongation of the liner, and varies depending on a tank temperature in the tank.

6. The gas filling method according to claim 4, wherein limiting the filling flow rate includes varying a limit of the filling flow rate depending on the calculated required elongation of the liner.

7. The gas filling method according to claim 6, wherein limiting the filling flow rate includes limiting the filling flow rate in such a manner that a map that defines a relationship between a liner deformation speed at the time of filling a gap between the liner and the reinforcement layer and a breaking elongation of the liner is consulted for the calculated required elongation of the liner to set a liner deformation speed that is lower than a liner deformation speed at which the load larger than or equal to the allowable amount acts on the liner.

8. The gas filling method according to claim 7, wherein
    a plurality of the maps are respectively provided for tank temperatures in the tank, and
    limiting the filling flow rate includes varying a limit of the filling flow rate depending on a tank temperature in the tank in such a manner that one of the plurality of maps, which corresponds to the tank temperature used to calculate the amount of gap, is consulted.

9. The gas filling method according to claim 2, wherein limiting the filling flow rate includes limiting the filling flow rate so that a liner deformation speed at which a gap between the liner and the reinforcement layer is filled is lower than a liner deformation speed at which the load larger than or equal to the allowable amount acts on the liner.

10. The gas filling method according to claim 2, wherein limiting the filling flow rate includes varying a limit of the filling flow rate depending on at least one of the calculated amount of gap, an elongation of the liner required to bring the amount of gap to zero, and a tank temperature in the tank.

11. The gas filling method according to claim 2, wherein
the tank is equipped for a mobile unit, and is configured so that gas may be filled from a gas station installed outside the mobile unit,
the mobile unit determines a limited filling flow rate, in limiting the filling flow rate, and transmits information about the determined limited filling flow rate to the gas station, and
the gas station fills the gas into the tank on the basis of the information about the limited filling flow rate, received from the mobile unit.

12. The gas filling method according to claim 2, wherein
the tank is equipped for a mobile unit, and is configured so that gas may be filled from a gas station installed outside the mobile unit, and
calculating the amount of gap, predicting whether the load larger than or equal to the allowable amount acts on the liner by the gas filling and limiting the filling flow rate are executed by the gas station.

13. The gas filling method according to claim 12, wherein, in calculating the amount of gap, the gas station receives information about a tank pressure and a tank temperature in the tank from the mobile unit via communication.

14. The gas filling method according to claim 1, further comprising, when the filling flow rate is limited to zero, prohibiting the gas filling.

15. A gas filling system comprising:
a mobile unit that is equipped with a tank having a liner and a reinforcement layer formed on an outer peripheral surface of the liner and
a gas station that is installed outside the mobile unit and that fills gas into the tank, wherein:
at least one of the mobile unit and the gas station includes
an information acquisition unit that acquires information about a tank pressure and a tank temperature in the tank,
a calculating unit that calculates an amount of a gap between the liner and the reinforcement layer before filling the gas into the tank on the basis of the information acquired by the information acquisition unit and a prestored map,
a predicting unit that calculates an elongation of the liner that is required to bring the calculated gap amount to zero and determines whether the calculated elongation falls below a predetermined threshold, and predicts whether a load larger than or equal to an allowable amount acts on the liner by filling the gas into the tank on the basis of the calculated elongation, and
a flow rate determining unit that, when it is predicted that the load larger than or equal to the allowable amount acts on the liner, determines to limit the filling flow rate at which the gas is filled into the tank in comparison with a case where it is predicted that the load larger than or equal to the allowable amount does not act on the liner.

16. The gas filling system according to claim 15, wherein
the gas station includes an operation control unit that controls filling of the gas into the tank, and
when it is predicted that the load larger than or equal to the allowable amount acts on the liner, the operation control unit fills the gas into the tank at a limited filling flow rate, to which the flow rate determining unit determines to limit the filling flow rate, during at least part of a first period of time during which the liner deforms by the gas filling to bring the amount of gap to zero.

17. A gas station that is installed outside a mobile unit equipped with a tank having a liner and a reinforcement layer formed on an outer peripheral surface of the liner, and that fills gas into the tank, comprising:
an information acquisition unit that acquires information about a tank pressure and a tank temperature in the tank;
a calculating unit that
calculates an amount of a gap between the liner and the reinforcement layer before filling the gas into the tank on the basis of the information acquired by the information acquisition unit and a prestored map;
a predicting unit that calculates an elongation of the liner that is required to bring the calculated gap amount to zero and determines whether the calculated elongation falls below a predetermined threshold and predicts whether a load larger than or equal to an allowable amount acts on the liner by filling the gas into the tank on the basis of the calculated elongation; and
a flow rate determining unit that, when it is predicted that the load larger than or equal to the allowable amount acts on the liner, determines to limit the filling flow rate at which the gas is filled into the tank in comparison with a case where it is predicted that the load larger than or equal to the allowable amount does not act on the liner.

18. The gas station according to claim 17, further comprising an operation control unit that controls filling of the gas into the tank, wherein
when it is predicted that the load larger than or equal to the allowable amount acts on the liner, the operation control unit fills the gas into the tank at a limited filling flow rate, to which the flow rate determining unit determines to limit the filling flow rate, during at least part of a first period of time during which the liner deforms by the gas filling to bring the amount of gap to zero.

19. The gas station according to claim 18, wherein the operation control unit fills the gas into the tank without limitations on the filling flow rate after a lapse of at least the first period of time.

20. The gas station according to claim 18, wherein, when the calculated elongation exceeds a predetermined threshold, the predicting unit predicts that the load larger than or equal to the allowable amount acts on the liner.

21. The gas station according to claim 18, wherein the flow rate determining unit varies a limit of the filling flow rate depending on at least one of the calculated amount of gap, an elongation of the liner required to bring the amount of gap to zero, and a tank temperature in the tank.

22. The gas station according to claim 17, wherein the information acquisition unit acquires results detected by a temperature sensor and a pressure sensor provided for the mobile unit as the information about a tank pressure and a tank temperature in the tank via communication.

23. A mobile unit that is equipped with a tank into which gas is filled from an external gas station, the tank having a liner and a reinforcement layer formed on an outer peripheral surface of the liner, comprising:
an information acquisition unit that acquires information about a tank pressure and a tank temperature in the tank;
a calculating unit that
calculates an amount of gap between the liner and the reinforcement layer before filling the gas into the tank on the basis of the information acquired by the information acquisition unit and a prestored map;
a predicting unit that calculates an elongation of the liner that is required to bring the calculated gap amount to zero and determines whether the calculated elongation falls below a predetermined threshold and predicts whether a load larger than or equal to an allowable amount acts on the liner by filling the gas into the tank on the basis of the calculated elongation;

a flow rate determining unit that, when it is predicted that the load larger than or equal to the allowable amount acts on the liner, determines to limit the filling flow rate at which the gas is filled into the tank in comparison with a case where it is predicted that the load larger than or equal to the allowable amount does not act on the liner; and a transmitter that transmits information about the limited filling flow rate, to which the flow rate determining unit determines to limit the filling flow rate, to the gas station.

24. The mobile unit according to claim 23, wherein, when the calculated elongation exceeds a predetermined threshold, the predicting unit predicts that the load larger than or equal to the allowable amount acts on the liner.

25. The mobile unit according to claim 23, wherein the flow rate determining unit varies a limit of the filling flow rate depending on at least one of the calculated amount of gap, an elongation of the liner required to bring the amount of gap to zero, and a tank temperature in the tank.

* * * * *